United States Patent Office 3,766,223
Patented Oct. 16, 1973

1

3,766,223
DISTEROIDYL ETHERS
Alberto Ercoli, Milan, Rinaldo Gardi, Carate Brianza, and Romano Vitali, Casatenovo, Italy, assignors to Warner-Lambert Company, Morris Plains, N.J.
No Drawing. Filed Mar. 30, 1972, Ser. No. 239,788
Claims priority, application Italy, Apr. 6, 1971, 22,762/71
Int. Cl. C07c *169/10, 169/22, 169/34*
U.S. Cl. 260—397.1                                32 Claims

ABSTRACT OF THE DISCLOSURE

Biologically active disteroidyl ethers wherein two steroid nuclei are joined together by an oxygen bridge between the carbon atoms in the 3-position of both nuclei, having the following partial structure, are disclosed:

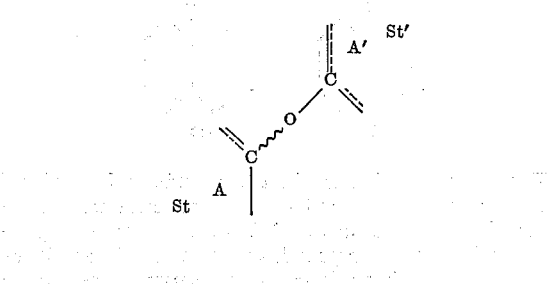

wherein the wavy line indicates that the oxygen atom linked in position 3 to the A ring may assume the α or β configuration, and the broken line indicates an optional double bond in position 3 for the steriod St and a double bond in position 2' or 3' for the steroid St'; St is a steriod residue belonging to the cholane, cholestane, estrane, androstane and pregnane series, and their 18-homo and 19-nor derivatives; St' is a steroid residue belonging to the androstane and pregnane series and their 18-homo and 19-nor derivatives. These new disteroidyl ethers of the invention are prepared by submitting a 3-hydroxy derivative of a steroid of the cholane, cholestane, estrane, androstane, or pregnane series, as well as their 18-homo and 19-nor derivatives, to trans-etherification with an activated derivative of a 3-ketosteroid of the androstane, or pregnane series, as well as of their 18-homo and 19-nor derivatives, under anhydrous conditions and in the presence of an acid catalyst.

GENERAL DESCRIPTION OF THE INVENTION

The present invention relates to novel compositions of matter known in the art of steroid chemistry as disteroidyl-ethers and to processes for their preparation. The disteroidyl ethers of this invention have valuable biological properties and consist of two steroid moieties joined together by an oxygen bridge which involves the carbon atoms in the 3-position of both steroid nuclei, according to the partial structure:

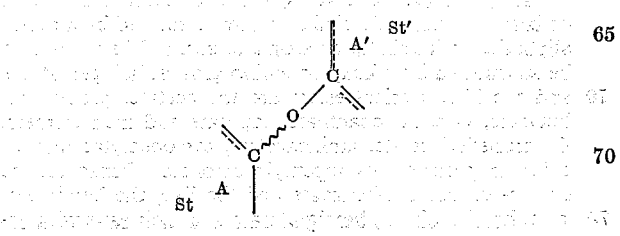

2 wherein the broken line indicates the presence of a possible double bond in position 3 of steroid St and of a double bond in positions 2' (3') or 3' (4') in steriod St'.

The positions of the steroid moiety St' are marked accordingly (i.e., $C^{1'}$, $C^{2'}$, $C^{3'}$ and so on) to distinguish them from the corresponding positions of the other steroid moiety St.

The steroid nucleus St whose carbon atom in position 3 is linked to the oxygen bridge, may belong to the cholane, cholestane, estrane, androstane or pregnane series, as well as to their 18-homo and 19-nor derivatives; the steroid nucleus St', similarly linked to the oxygen bridge in 3-position, may belong to the androstane or pregnane series, as well as to their 18-homo and 19-nor derivatives.

The process by which the new disteroidyl-ethers of the invention are prepared, consists of submitting, under suitable conditions, a 3-hydroxy steroid of the cholane, cholestane, estrane, androstane, or pregnane series, as well as of their 18-homo and 19-nor derivatives, to trans-etherification with an activated derivative of a 3-ketosteroid of the androstane or pregnane series, as well as of their 18-homo and 19-nor derivatives.

This reaction is carried out under anhydrous conditions, in the presence of an acid catalyst at temperatures between 50° C. and 200° C. for a period of from about 30 minutes to 4 hours. The term "activated derivative of 3-ketosteroid" is used herein to indicate the typical and well known enol- or acetal-derivatives, such as enol ethers, enol esters, hemiacetals or acetals of the 3-keto function, preferably alkyl enol ethers or dialkyl acetals of said 3-ketosteroid.

Included among the preferred embodiments of the compositions of matter of this invention are disteroidyl ethers of the androstane-androstane series, pregnane-pregnane series and androstane-pregnane series represented by the following structural Formulae I to IV:

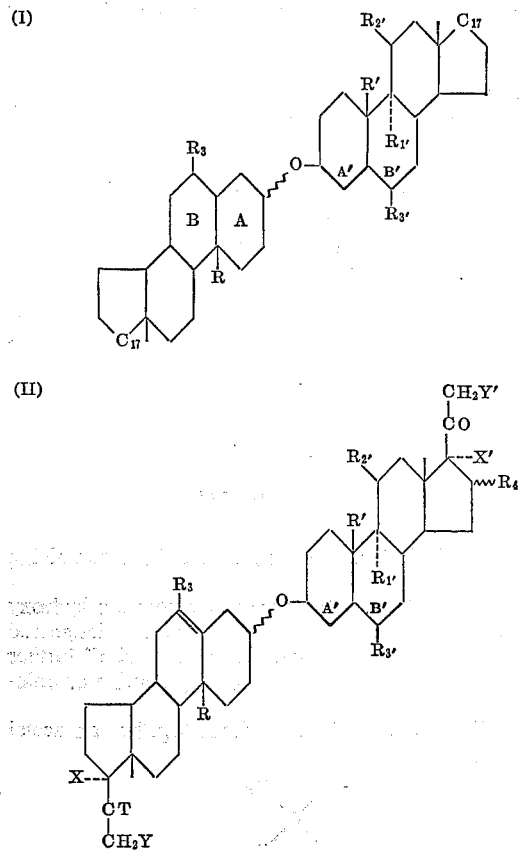

(III) 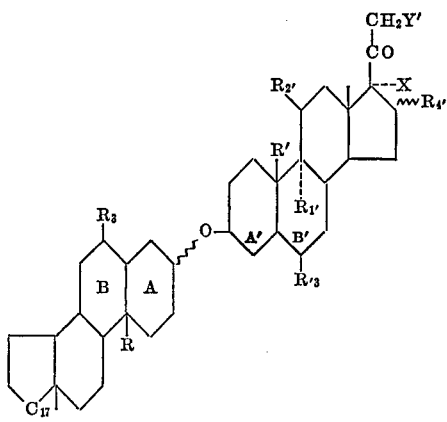

(IV) 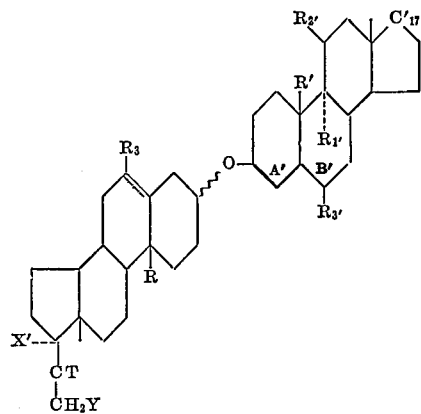

In the above Formulae I to IV the wavy line indicates that the oxygen atom linked in 3 position to the ring A may assume an α or β configuration;

R and R' each represent hydrogen or methyl;
$R_{1'}$ represents hydrogen or a halogen atom;
$R_{2'}$ represents hydrogen, a hydroxy or a ketonic oxygen; or a chlorine atom, when $R_{1'}$ is also a chlorine atom;
$R_3$ and $R_{3'}$ each represent hydrogen, a methyl group, a halogen atom or a ketonic oxygen;
$R_{4'}$ represents hydrogen, a halogen atom, an α-hydroxy, optionally esterified with an aliphatic acid containing up to 4 carbon atoms; or an α or β-methyl radical;
$C_{17}$ and $C'_{17}$ each represent one of the following groups:

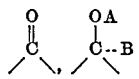

wherein A represents hydrogen, an aliphatic or cycloaliphatic radical containing up to 6 carbon atoms or an acyl radical, hereinafter designated Ac, containing up to 8 carbon atoms; B represents hydrogen or a saturated or unsaturated alkyl radical containing up to 4 carbon atoms;

T represents ketonic oxygen or a

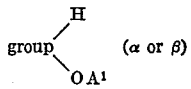

where $A^1$ is hydrogen or an acyl radical containing up to 8 carbon atoms;
X and X', Y and Y' each represent hydrogen, a hydroxy group or an acyloxy radical, hereinafter designated OAc, containing up to 8 carbon atoms; and Y' further represents a halogen atom, preferably fluorine or chlorine;
X' and Y' or X' and $R_{4'}$ may form together an acetal bond

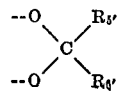

wherein $R_{5'}$ represents an alkyl radical containing up to 6 carbon atoms or an aryl radical, and $R_{6'}$ represents an alkyl or alkoxy radical containing up to 4 carbon atoms; or

may represent a cycloalkyl containing from 5 to 12 carbon atoms.

The hydrogen atom in position 5, if present, may have the α or β configuration.

In the compounds of Formulae I to IV the rings A' and B' show, according to the structure of the reacting 3-ketosteroid, one of the following structures:

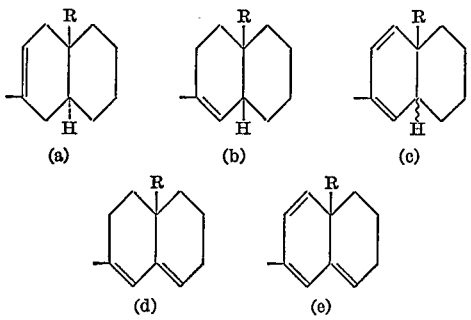

The rings A and B in the compounds of Formulae I and III may be saturated or show an unsaturation between the carbon atoms in 1:2; 4:5; 5:6 or 5:10 positions, while in the compounds of Formulae II and IV the optional double bond is contained between the carbon atoms in 5:6 position.

The compounds of the invention may show, besides the above mentioned substituents, a methyl radical in positions 1 and 1', thio-acyl groups in positions 1' and 7', an optionally substituted hydroxy group or a halogen atom in position 16 and a methylene bridge in position 1':2'. The 13 and 13' positions may carry an ethyl radical instead of a methyl radical, and position 17 may be further substituted by a cholane or cholestane chain.

Also some 17'-spiro lactones of the above compounds are included within the scope of this invention: among them, the compounds in which the 3-ketosteroid moiety consists of the 17-spiro-lactone of 7'-acyl substituted compounds and particularly of the 17-spiro-lactone of 3-keto-7α-acetylthio-androst-4-ene and of its 19-nor analog are particularly interesting.

An object of this invention consists of the compounds of Formula I wherein the alcoholic moiety of the disteroidylether is formed by bile-acids and their derivatives, their salts with alkali metals, their esters with low molecular weight alcohols and particularly their amides formed by reaction with compounds such as glycine and taurine.

A further object of this invention is represented by disteroidyl compounds in which the 3-ketosteroid moiety is formed by aldosterone, 17-isoaldosterone and their derivatives.

The acyl radical, Ac, which is present in the disteroidyl compounds of the invention derives from organic acids containing up to 8 carbon atoms. Particularly, these acids may be saturated or unsaturated organic carboxylic acids, including the aromatic acids, and may contain a straight or branched aliphatic chain or may be formed by a cycloaliphatic, arylaliphatic or aromatic group. They may also be substituted by alkoxy or amino groups, halogen atoms and the like. Typical esters are the acetate, propionate, butyrate, valerate, enanthate, caproate and their isomers, the trimethylacetate, aminoacetate, cyclopentylacetate, β-chloropropionate, cyclopentylpropionate, benzoate, p.chloro- or p.fluoro-benzoate and the like, the hemimalonate, hemisuccinate, hemiglutarate and their salts with organic or inorganic bases. Other particularly interesting derivatives are obtained by esterification with inorganic acids, preferably the sulphuric or phosphoric acid.

The aliphatic or cycloaliphatic radical may be straight or branched, saturated or unsaturated and optionally substituted by functional groups. It is typically represented by radicals such as methyl, ethyl, vinyl, propyl, butyl, amyl, hexyl, ethoxyethyl and their isomers, cyclopropyl, cyclobutyl, cyclopentyl, cyclohexyl, cycloheptyl, cyclooctyl, cyclopentenyl, cyclohexenyl, cyclooctenyl, 1-methoxycyclohexyl, 1-ethoxycyclohexyl, cyclopropylmethyl, tetrahydropyranyl and the like.

The new disteroidyl ethers of this invention exhibit improved and/or increased hormonal properties as compared with those possessed by the two steroid entities. This means that the resulting properties in the new compounds are not merely a sum of the activities of the two individual steroid moieties since the disteroidyl compounds show a degree of activity and a biological behavior which are different from those shown by a simple mixture of the two constituting steroids.

In particular, the disteroidyl ethers of Formula I wherein both the $C_{17}$ and $C'_{17}$ carbon atoms have the structure

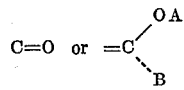

(B being hydrogen or lower saturated alkyl) are androanabolic agents having a favorable anabolic/androgenic ratio. Therefore, the new compounds may be advantageously used in place of androgenic or anabolic agents used in known pharmaceutical preparations and may be orally or subcutaneously administered to patients, the route and dose varying with the nature and the severity of the symptoms to be treated.

Typical derivatives of this class of compounds include:

3β-(17'β-propionoxyestra-3',5'-dien-3'-yloxy)-5α-androstan-17-one;

3β-(17'β-propionoxyestra-3',5'-dien-3'-yloxy)-5α-androst-1-en-17β-ol acetate;

3β-(17'β-propionoxyestra-3',5'-dien-3'-yloxy)-5α-androstan-17β-ol.

These compounds show a significant androgenic and myogenic effect and are particularly active when administered by oral route.

The new disteroidyl ethers of Formula I wherein the $C_{17}$ carbon atom has the above structure and the $C'_{17}$ carbon atom has the structure

(B being a lower alkenyl or alkynyl radical, i.e. 17'α-vinyl, allyl, allenyl, ethynyl, propynyl and the like) possess andro-anabolic and progestational activities and therefore are useful as progestinic agents for the treatment of physiological disorders in female animals and in women in a similar manner as known progestins, e.g. progesterone, ethisterone, norethindrone and the like. As a consequence, they have properties which are usually connected with a progestinic activity, i.e. they have effect on the reproductive physiology and exhibit anti-conceptional activity.

Representatives of this class of compounds are:

3β-(17'β-acetoxy-19'-nor-17'α-pregna-3',5'-dien-20'-yn-3'-yloxy)-androst-5-en-17-one;

3β-(17'β-acetoxy-19'-nor-17'α-pregna-3',5'-dien-20'-yn-3'-yloxy)-androst-5-en-17β-ol;

3α-(17'β-acetoxy-19'-nor-17'α-pregna-3',5'-dien-20'-yn-3'-yloxy)-5α-androstan-17-one;

3α-(17'β-acetoxy-19'-nor-17'α-pregna-3',5'-dien-20'-yn-3'-yloxy)-5α-androstan-17-one;

3β-(17'β-hydroxy-19'-nor-17'α-pregna-3',5'-dien-20'-yn-3'-yloxy)-androst-5-en-17β-ol.

The progestative effect of the above class of compounds is highly potentiated when a 17α-alkenyl or alkynyl group is also present in the $C_{17}$ position, such as in:

3β-(17'β-hydroxy-19'-nor-17'α-pregna-3',5'-dien-20'-yn-3'-yloxy)-19-nor-17α-pregn-5-en-20-yn-17β-ol;

3β-(17'β-acetoxy-19'-nor-17'α-pregna-3',5'-dien-20'-yn-3'-yloxy)-19-nor-17α-pregn-5-en-20-yn-17β-ol acetate.

These compounds are potent antifertility agents, active by oral or parenteral administration, and can be advantageously used for controlling reproduction in animals.

The disteroidyl ethers of Formula II in which the hydrogen atoms at the 5 and 5' positions have the β-configuration and the substituents X, X', Y and Y' are all hydrogen, show CNS depressant activity. These compounds are useful as sedative, hypnotic or anaesthetic agents.

The disteroidyl ethers of Formula II in which the hydrogen atoms at the 5 and 5' positions have the α-configuration and wherein Y and Y' represent hydrogen, possess progestational activity and are effective in maintaining pregnancy in experimental animals. The following compounds are particularly active:

3β-(17'α-acetoxy-20'-oxo-6'-methylpregna-3',5'-dien-3'-yloxy)-pregn-5-en-20-one;

3β-(17'α-acetoxy-20'-oxopregna-3',5'-dien-3'-yloxy)-17α-hydroxypregn-5-en-20-one acetate.

The disteroidyl ethers of Formula II in which Y and Y' are other than hydrogen have mineralcorticoid, glucocorticoid and anti-inflammatory properties and can be used for the treatment of anti-inflammatory conditions in animals and in humans in the same manner as known corticoids. Thus, they can be administered orally in the form of tablets or capsules, or topically as creams, lotions or in the form of ophthalmic suspensions.

Disteroidyl compounds of Formula III and IV may exhibit andro-anabolic activity or andro-anabolic-progestinic activity or anti-fertility and contraceptive activity or cortico-anabolic activity depending from the nature of the steroid components.

Thus, when Y, Y', and X, X' represent hydrogen and hydroxy group respectively and the carbon atom in position 17, $C'_{17}$, have the structure

wherein B is hydrogen or lower saturated alkyl, the compounds of the above two Formulae III and IV possess a clear andro-anabolic activity.

When Y and Y' are represented by hydrogen and X and X' are hydrogen or acyloxy group and the carbon atom in position 17, $C_{17}$ and $C'_{17}$, have still the structure above defined, the compounds of Formulae III and IV display a definite progestational activity combined with a desired anabolic action. In such compounds it is interesting to note that the progestinic moiety acts as anti-androgenic agent and so improves the anabolic/androgenic ratio of the resulting disteroidyl molecule.

These compounds may be usefully employed in therapy in all those diseases when deficiency of progesterone is noted and anabolic hormones are also prescribed. They are suitable both for oral and subcutaneous treatment.

The progestational activity of the above class of compounds is highly potentiated in those disteroidyl compounds of Formula III or IV wherein Y, Y' and X, X' have the above definitions but the B substituent to the carbon atom in position $C_{17}$ (or $C'_{17}$) is represented by a lower alkenyl or alkynyl radical, such as vinyl, allyl, allenyl, ethynyl, propynyl and the like. These compounds are highly effective progestinic agents and also may show contraceptive activity. They are suitable for oral or parenteral administration. Representatives of this class of compounds are:

3β-(17′β-acetoxy-19′-nor-17′α-pregna-3′,5′-dien-20′-yn-3′-yloxy)-17α-hydroxypregn-5-en-20-one acetate;

3β-(17′β-acetoxy-19′-nor-17′α-pregna-3′,5′-dien-20′-yn-3′-yloxy)-pregn-5-en-20-one;

3β-(17′β-acetoxy-19′-nor-17′α-pregna-3′,5′-dien-20′-yn-3′-yloxy)-pregn-5-en-20-ol hemisuccinate;

3β-(17′β-enanthoxy-19′-nor-17′α-pregna-3′,5′-dien-20′-yn-3′-yloxy)-pregn-5-en-20-one;

3β-(17′β-enanthoxy-19′-nor-17′α-pregna-3′,5′-dien-20′-yn-3′-yloxy)-pregn-5-en-20β-ol;

3β-(17′β-enanthoxy-19′-nor-17′α-pregna-3′,5′-dien-20′-yn-3′-yloxy)-pregn-5-en-20β-ol hemisuccinate;

3β-(17′β-hydroxy-21′-methylene-19′-nor-17′α-pregna-3′,5′-dien-3′-yloxy)-pregn-5-en-20β-ol 20-hemisuccinate;

3β-(17′β-hydroxy-21′-methylene-19′-nor-17′α-pregna-3′,5′-dien-3′-yloxy)-pregn-5-en-20α-ol hemisuccinate.

When in Formulae III or IV Y and Y′ are other than hydrogen, the compounds display an improved corticoid activity with reduced side effects, such as a lower catabolic and adrenolitic effect. These positive modifications are due to the activity of the androanabolic moiety of the disteroidyl molecule. Compounds of this kind are particularly interesting as therapeutic agents and can be usefully employed in all those diseases where a corticoid therapy is required. In particular, they have been found interesting anti-inflammatory agents, suitable for oral administration, such as 3β-(9′α-fluoro-11′,20′-dioxo-17′α-hydroxy-21′-hemisuccinoxy - 16′β - methylpregna-1′,3′,5′-trien-3′-yloxy)-androst-5-en-17-one.

A further object of this invention is represented by disteroidyl compounds in which the 3-hydroxysteroid moiety is formed by hormones of the estratriene series, such as, estrone, estriol, 17-epiestriol, estradiol, 17α-ethinyl estradiol and their 17β-esters, and the 3-ketosteroid moiety belongs to the class of Δ⁴-3-ketones having progestational or adreno-cortical activity.

These new disteroidyl ethers may be represented by the following structural formula (V)

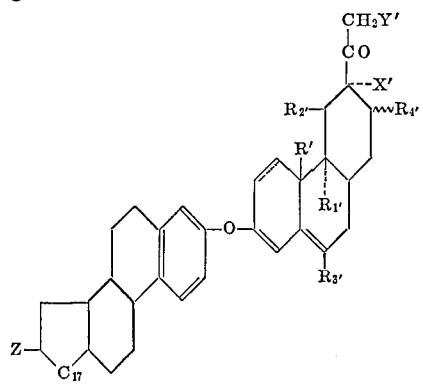

wherein the broken line in 1′:2′ position indicates the optional presence of a double bond;

R′ represents hydrogen or methyl;

$R_{1'}$ represents hydrogen or a halogen atom;

$R_{2'}$ represents hydrogen, a hydroxy group or a ketonic oxygen or a chlorine atom when $R_1$ is also a chlorine atom;

$R_{3'}$ represents hydrogen, a methyl radical or a halogen atom;

$R_{4'}$ represents hydrogen, a halogenation, an α-hydroxy group, free or esterified with an aliphatic acid containing up to 4 carbon atoms; or an α or β methyl radical;

X′ and Y′ each represents hydrogen, a hydroxy group or an acyloxy radical containing up to 8 carbon atoms, and Y′ further represents a halogen atom;

$C_{17}$ represents

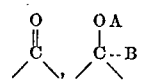

wherein A represents hydrogen, or an acyl radical containing up to 8 carbon atoms; B represents hydrogen or an ethinyl group; Z is hydrogen, a free or esterified α or β hydroxy group or a halogen atom.

Of course, the disteroidyl ethers corresponding to the above formula may display estro-progestinic activity (when Y′ is hydrogen) or may show estro-corticoid activity (when Y′ is other than hydrogen), depending to the nature and biological activity of the steroid moiety St′. Of particular interest are compounds which incorporate a cortical moiety since they have been found to possess high anti-inflammatory activity and can be advantageously used for the treatment of inflammatory conditions in the same manner as known corticoids.

DESCRIPTION OF THE PROCESS

According to the present invention, the process for the preparation of the new disteroidyl derivatives of Formula I consists in reacting a 3-hydroxy derivative of a steroid of the estrane, androstane, pregnane, cholane or cholestane series and their 18-homo and 19-nor derivatives under anhydrous conditions in a suitable solvent and in the presence of an acid catalyst with the enol ether or the acetal of a 3-ketosteroid of the androstane or pregnane series and of their 18-homo and 19-nor derivatives. Benzene, toluene, xylol, dioxane, dimethylformamide and isooctane may be used as solvents, As the acid catalyst, p-toluenesulfonic acid, naphthalenesulfonic acid, pyridine p-toluene sulfonate, and pyridine chlorhydrate, are preferably used. The trans-etherification reaction is effected at a temperature between 50° C. and 200° C., preferably at a temperature higher than 70° C., for a period of from 30 minutes to 4 hours, as fully described in the examples.

The resulting disteroidyl ether is separated from the reaction mixture, purified and, whether necessary, is further submitted to usual chemical reactions in order to obtain the desired final compound.

The present invention includes all those compounds which may be obtained through obvious reactions, such as saponification which may be carried out on any possible acyloxy group present in the disteroidyl compound; acylation or etherification, by which a desired acyloxy or an ether group may be introduced in place of a free hydroxy group and alkylation generally carried out by means of an appropriate alkyl magnesium halide.

The structure of the disteroidyl derivative obtained throuhg the etherification of a 3α- or 3β-hydroxysteroid with an alkyl or alkylsubstituted enol ether or dialkyl acetal of a keto-steroid as above cited strictly depends from the nature of the steroid itself. The following scheme is given:

| Parent 3-keto compound | Enolether or acetal starting materials | | Structure of the rings A′ and B′ in the disteroidyl compound |
|---|---|---|---|
| 3-keto-5α-steroid | 3-keto-5α-steroid enol ether | 3-keto-5α-steroid acetal | (a) Δ²-ene,5α. |
| 3-keto-5β-steroid | 3-keto-5β-steroid enol ether | 3-keto-5β-steroid acetal | (b) Δ²-ene,5β. |
| Δ¹-3-keto-5α-steroid | Δ¹-3-keto-5α-steroid enol ether | 1α-alkoxy-3-keto-5α-steroid acetal | (c) Δ¹,²-diene,5α. |
| Δ¹-3-keto-5β-steroid | Δ¹-3-keto-5β-steroid enol ether | 1α-alkoxy-3-keto-5β-steroid acetal | (c¹) Δ¹,²-diene,5β. |
| Δ⁴-3-keto-steroid | Δ⁴-4-keto-steroid enol ether | | (d) Δ³,⁵-diene. |
| Δ¹,⁴-3-keto-steroid or 1α-alkoxy Δ⁴-3-keto-steroid | Δ¹,⁴-3-keto-steroid or 1α-alkoxy-Δ⁴-3-keto-steroid enol ether. | | (e) Δ¹,³,⁵-triene. |

The preferred alkyl-or substituted alkyl-enol ethers are those containing from 1 to 7 carbon atoms, such as methyl-, ethyl-, β-halogen substituted ethyl-, propyl-, butylenol ethers and their isomers. Furthermore the cycloalkylenol ethers containing 5 or 6 carbon atoms or an alkyl-enol ether are also used. As acetal, the dimethyl- or diethylacetal is preferably used.

Preparation of the starting materials (a) and (b) The acetals of saturated 3-ketones (5α or 5β) may be easily prepared by simultaneous action of an alkyl orthoformate and the corresponding alcohol over the 3-ketone according to Serini and Köster's mthod (Ber. 71, 1766, 1938). The enol ethers of saturated 3-keto steroids (5α or 5β) may also be obtained by reacting the 3-keto steroid with methanol in the presence of an acid catalyst, according to the method of M. Janot et al. (Bull. Franc. 2109, 1961) or to the method of J. Slomp et al. (J.A.C.S. 77, 1216, 1955).

By submitting a dialkyl acetal of the saturated 3-ketone to pyrolysis under analogous conditions to those disclosed by H. H. Inhoffen and Coll. (Ann. 568, 52, 1950), the corresponding enol is obtained. It will have the structure: (a) $\Delta^2$-ene, 5α, if the 3-keto steroid belongs to the series 5α, or the structure (b) $\Delta^3$-ene-5β if the 3-keto belongs to the series 5β.

The enol ethers of 3-keto-5α-steroids having a $\Delta^2$-ene structure may be obtained, according to the method described in our U.S. Pat. No. 3,118,917, by catalytic hydrogenation of the double bond in 5-position from the corresponding enol ethers of analogous $\Delta^4$-3-ketones (that is ethers of 3-oxy-$\Delta^{3,5}$-diene steroids), followed by spontaneous migration of the remaining double bond from the 3:4 position to the 2:3 position.

The enol ethers of 3-keto 5α-steroids having $\Delta^3$-ene structure may be obtained, according to the method described in our U.S. Pat. No. 3,264,329, by catalytic hydrogenation of the corresponding enol ethers of $\Delta^4$-3-ketosteroids in the presence of a catalytic amount of a basic substance.

(c) and (c') The enol ethers of $\Delta^1$-3-keto-5α-steroids having the $\Delta^{1,3}$-diene structure may be obtained by submitting the triethers of 1α,3,3-trihydroxy-5α-steroids to pyrolysis as described in British Pat. No. 1,203,278 and as disclosed and claimed in the U.S. Pat. application Ser. No. 830,841 filed June 5, 1969, now abandoned.

The pyrolysis reaction is preferably carried out at a temperature of from 60° C. to 155° C., in the presence of a suitable acid catalyst.

The triethers of 1α,3,3-trioxysteroids starting materials are in their turn prepared by the process disclosed and claimed in the U.S. Pat. No. 3,475,467. They may be obtained by treating the $\Delta^1$-3-keto-5α-steroids with an alcohol and an orthoformate under anhydrous conditions at a temperature lower than 60° C. in the presence of an acid catalyst.

According to the process of the present invention, both 1α,3,3-trialkoxysteroids and the corresponding $\Delta^1$-3-keto enol ether may be used for the condensation reaction with the 3ξ-hydroxy steroid but the formers, being the precursors of the enol ethers, have the advantage of a more immediate preparation and therefore, may be preferred starting materials for the preparation of the disteroidyl derivatives having a $\Delta^{1,3}$-diene structure.

(d) The enol ethers of $\Delta^4$-3-ketones may be easily prepared by submitting the $\Delta^4$-3-ketosteroid to enol etherification with an alkyl orthoformate or an alcohol, according to well known procedures of the art.

When, as reagent material in the method of the present invention, there is used an enol ether of a $\Delta^4$-3-ketone containing a higher alkyl radical than methyl or ethyl, the method disclosed in our U.S. Pat. No. 3,019,241 may be applied to the preparation of such reacting materials. This method consists in submitting the methyl- or ethyl-enol ether to trans (enol)-etherification by treatment with a higher alcohol.

(e) The 3-enolethers of 3-keto-$\Delta^{1,4}$-steroids may be obtained by enol-etherification of the 3-keto $\Delta^{1,5}$-pregnadiene with ethyl orthoformate and an alcohol in the presence of a strong acid catalyst as described in the U.S. Pat. No. 3,068,253. In place of the 3-enolethers of 3-keto-$\Delta^{1,4}$-steroids there may be used, for the preparation of the disteroidyl compounds having a $\Delta^{1,3,5}$-triene structure, the corresponding alkyl enol ethers of 1α-alkoxy-$\Delta^4$-3-ketones (or 1α,3-dialkoxy-$\Delta^{3,5}$-dienes). These compounds are obtained by submitting the $\Delta^{1,4}$-3-keto-steroids to the simultaneous action of an alkyl orthoformate and of the corresponding alcohol under anhydrous conditions at a temperature lower than 60° C., in the presence of a suitable acid catalyst.

The method for preparing 1α,3-dialkoxy-$\Delta^{3,5}$-diene steroids of the pregnane series is disclosed in our U.S. Pat. No. 3,506,650. This method may be applied to the preparation of corresponding 1α,3-dialkoxy-$\Delta^{3,5}$-diene steroids of the androstane series and of their 19-nor or 18-homo derivatives.

The following examples are given to illustrate the invention without limiting it.

In order to make easier the description of the preparation of a number of compounds of the invention, the reacting starting steroids of all examples have been listed in two separated Tables A and B and marked by a progressive number following the letter A or B. In Table A are listed the 3-hydroxy steroids and in Table B are listed the 3-keto-steroids or activated derivatives thereof.

TABLE A $A_1$---- 3β-hydroxy-androst-5-en-17-one.
$A_2$---- Estra-1,3,5(10)-triene-3,17β-diol 17-propionate.
$A_3$---- 3β,17α-dihydroxypregn-5-en-20-one 17-acetate.
$A_4$---- 19-nor-17α-pregn-5-en-20-yne-3β,17β-diol 17-enanthate.
$A_5$---- 5α-androst-1-ene-3β,17β-diol 17-acetate.
$A_6$---- 3β-hydroxy-5α-androstan-17-one.
$A_7$---- 3β-hydroxy-pregn-5-en-20-one.
$A_8$---- 19-nor-17α-pregn-5-en-20-yne-3β,17β-diol 17-acetate.
$A_9$---- 3-hydroxyestra-1,3,5(10)-trien-17-one.
$A_{10}$--- 17α-ethynylestra-1,3,5(10)-triene-3,17β-diol 17-acetate.
$A_{11}$--- 3α-hydroxy-5β-pregnan-20-one.
$A_{12}$--- 3α-hydroxy-5α-androstan-17-one.
$A_{13}$--- 3α-hydroxy-5β-androstan-17-one.
$A_{14}$--- Cholest-5-en-3β-ol.
$A_{15}$--- Methyl 3α-hydroxy-12α-acetoxy-5β-cholan-24-oate.
$A_{16}$--- 5α-androstane-3α,17β-diol 17-acetate.
$A_{17}$--- Pregn-5-ene-3β,20β-diol 20-acetate.
$A_{18}$--- 3β-hydroxyandrost-4-ene-6,17-dione.
$A_{19}$--- Pregn-5-ene-3β,20α-diol 20-acetate.
$A_{20}$--- 3α-hydroxy-5α-pregnan-20-one.
$A_{21}$--- 3β,21-dihydroxypregn-5-en-20-one 21-acetate.
$A_{22}$--- Estra-1,3,5(10)-triene-3,17β-diol 17-acetate.
$A_{23}$--- 3-hydroxyestra-1,3,5(10)-triene-6,17-dione.
$A_{24}$--- Estr-5(10)-ene-3α,17β-diol 17-acetate.
$A_{25}$--- 3β,17α-dihydroxy-6-methylpregn-5-en-20-one 17-acetate.
$A_{26}$--- 3β,17α-dihydroxy-6-chloropregn-5-en-20-one 17-acetate.
$A_{27}$--- 3β,17α-dihydroxy-19-norpregn-5-en-20-one 17-acetate.
$A_{28}$--- 3β-hydroxy-19-norpregn-5-en-20-one.
$A_{29}$--- Estra-1,3,5(10)-triene-3,16α,17β-triol 16,17-diacetate.
$A_{30}$--- Estra-1,3,5(10)-triene-3,16β,17β-triol 16,17-diacetate.
$A_{31}$--- Estra-1,3,5(10)-triene-3,16α,17α-triol 16,17-diacetate.
$A_{32}$--- Estra-1,3,5(10)-trien-3,16α,17β-triol 16,17-dipropionate.
$A_{33}$--- Estra-1,3,5(10)-triene-3,17α-diol 17-acetate.
$A_{34}$--- 5β-pregnane-3α,20α-diol 20-acetate.
$A_{35}$--- 6α-fluoro-5α-androstane-3β,17β-diol 17-acetate.
$A_{36}$--- 6α-chloro-5α-androstane-3β,17β-diol 17-acetate.

TABLE B $B_1$---- 3,3-dimethoxy-5α-androstan-17β-ol propionate.
$B_2$---- 3-ethoxy-19-nor-17α-pregna-3,5-dien-20-yn-17β-ol acetate.
$B_3$---- 3-ethoxy-17α-hydroxypregna-3,5-dien-20-one acetate.
$B_4$---- 3-methoxy-19-nor-17α-pregna-3,5-dien-20-yn-17β-ol enanthate.
$B_5$---- 3-ethoxyestra-3,5-dien-17β-ol propionate.
$B_6$---- 3-ethoxy-19-nor-17α-pregna-3,5-dien-20-yn-17β-ol cyclopentanecarboxylate.
$B_7$---- 1α,3-dimethoxy-17α,21-dihydroxypregna-3,5-diene-11,20-dione 21-acetate.
$B_8$---- 3,3-dimethoxy-5β-pregnan-20-one.
$B_9$---- 3-ethoxy-19-nor-pregna-3,5-dien-20-one.
$B_{10}$--- 3-ethoxy-6-chloro-17α-hydroxy-pregna-3,5-dien-20-one acetate.
$B_{11}$--- 3-ethoxy-19-nor-17α-pregna-3,5-dien-20-yn-17β-ol benzoate.
$B_{12}$--- 3-ethoxy-13-ethyl-17α-ethynylgona-3,5-dien-17β-ol acetate.
$B_{13}$--- 3-methoxy-21-methylene-19-nor-17α-pregna-3,5-dien-17β-ol acetate.
$B_{14}$--- 3-ethoxy-17α-methylestra-3,5-dien-17β-ol acetate.
$B_{15}$--- 3-ethoxyestra-3,5-dien-17-one.
$B_{16}$--- 3-methoxy-9α-fluoro-17α,21-dihydroxy-16β-methylpregna-1,3,5-triene-11,20-dione 21-acetate.
$B_{17}$--- 3-ethoxyandrosta-3,5-dien-17β-ol acetate.

TABLE B—Continued

- B₁₈... 3,3-dimethoxy-21-hydroxy-5β-pregnan-20-one acetate.
- B₁₉... 3-ethoxy-21-hydroxy-5α-pregn-2-en-20-one acetate.
- B₂₀... 1α,3,3-trimethoxy-5α-androstan-17β-ol acetate.
- B₂₁... 1α,3,3,trimethoxy-5α-androstan-17β-ol enanthate.
- B₂₂... 1α,3-dimethoxy-17α,21-dihydroxypregna-3,5-diene-11,20-dione 17,21-diacetate.
- B₂₃... 3,3-dimethoxy-5β-androstan-17β-ol propionate.
- B₂₄... 3-methoxy-1-methyl-5α-androsta-1,3-dien-17β-ol acetate.
- B₂₅... 3-ethoxy-9α-fluoro-17α-methylandrosta-3,5-diene-11β,17β-diol acetate.
- B₂₆... 3,3-dimethoxy-5α-pregnan-20-one.
- B₂₇... 3,3-dimethoxy-5β-pregnan-11,20-dione.
- B₂₈... 3,3-dimethoxy-17α-hydroxy-5β-pregnane-11,20-dione acetate.
- B₂₉... 3-ethoxy-17α-hydroxy-16-methylenepregna-3,5-dien-20-one acetate.
- B₃₀... 3-ethoxy-16α,17α-(1'-methylbenzylidenedioxy)-pregna-3,5-dien-20-one.
- B₃₁... 3-ethoxy-6α,21-dimethyl-17α-pregna-3,5-dien-20-yn-17β-ol acetate.
- B₃₂... 3-ethoxy-17α,21-dihydroxypregna-3,5-diene-11,20-dione 21-acetate.
- B₃₃... 3-methoxy-11β,17α,21-trihydroxypregna-1,3,5-triene-20-one 21-acetate.
- B₃₄... 3-methoxy-9α,11β-dichloro-17α,21-dihydroxypregna-1,3,5-trien-20-one 21 acetate.
- B₃₅... 3-methoxy-9α,11β-dichloro-17α,21-dihydroxy-16α-methylpregna-1,3,5-trien-20-one 21-acetate.
- B₃₆... 3-methoxy-9α,11β-dichloro-17α,21-dihydroxy-16β-methylpregna-1,3,5-trien-20-one 21-acetate.
- B₃₇... 3-methoxy-9α-fluoro-11β,17α,21-trihydroxy-16α-methylpregna-1,3,5-trien-20-one 21-acetate.
- B₃₈... 3-methoxy-9α-fluoro-17α,21-dihydroxy-16α-methylpregna-1,3,5-triene-11,20-dione 17,21-diacetate.
- B₃₉... 3-methoxy-9α-fluoro-11β,17α,21-trihydroxy-16β-methylpregna-1,3,5-trien-20-one 21-acetate.
- B₄₀... 3-methoxy-9α-fluoro-11β,17α,21-trihydroxy-16β-methylpregna-1,3,5-trien-20-one 17,21-diacetate.
- B₄₁... 3-methoxy-9α-fluoro-11β,17α,21-trihydroxy-16-methylenepregna-1,3,5-trien-20-one 21-acetate.
- B₄₂... 3-methoxy-9α-fluoro-17,21-dihydroxy-16-methylenepregna-1,3,5-triene-11,20-dione 17,21-diacetate.
- B₄₃... 3-methoxy-9α-fluoro-16α,17α-isopropylidenedioxy-21-hydroxypregna-1,3,5-triene-11,20-dione 21-acetate.
- B₄₄... 3-ethoxy-6α-fluoro-11β,21-dihydroxy-16α,17α-isopropylidenedioxy pregna-3,5-dien-20-one 21-acetate.
- B₄₅... 3-methoxy-6α-fluoro-16α,17α-isopropylidenedioxy-21-hydroxypregna-1,3,5-triene-11,20-dione 21-acetate.
- B₄₆... 3-methoxy-6α-fluoro-11β,21-dihydroxy-16α,17α-isopropylidenedioxypregna-1,3,5-trien-20-one 21-acetate.
- B₄₇... 3-methoxy-6α,9α-difluoro-11β,17α,21-trihydroxypregna-1,3,5-trien-20-one 17,21-diacetate.
- B₄₈... 3-methoxy-6α,9α-difluoro-17α,21-dihydroxypregna-1,3,5-triene-11,20-dione 21-acetate.
- B₄₉... 3-ethoxy-17α-hydroxy-6-methylpregna-3,5-dien-20-one acetate.
- B₅₀... 3-ethoxyandrosta-3,5-dien-17-one.
- B₅₁... 3-methoxy-6α,9α-difluoro-17α,21-dihydroxypregna-1,3,5-triene-11,20-dione 17,21-diacetate.
- B₅₂... 3-methoxy-6α,9α-difluoro-11β,17α-dihydroxypregna-1,3,5-trien-20-one 17-propionate.[1]
- B₅₃... 3-methoxy-6α,9α-difluoro-17α-hydroxypregna-1,3,5-triene-11,20-dione propionate.
- B₅₄... 3-ethoxy-21-hydroxypregna-3,5-dien-20-one acetate.
- B₅₅... 3-ethoxy-17α-pregna-3,5-dien-21,17β-carbolactone.
- B₅₆... 3-ethoxy-7α-mercapto-17α-pregna-3,5-diene-21,17β-carbolactone acetate.
- B₅₇... 3-ethoxy-19-nor-17α-pregna-3,5-diene-21,17β-carbolactone.
- B₅₈... 3-ethoxy-7α-mercapto-19-nor-17α-pregna-3,5-diene-21,17β-carbolactone acetate.
- B₅₉... 3-ethoxy-11β-methyl-19-nor-17α-pregna-3,5-dien-20-yn 17β-ol.
- B₆₀... 3-methoxy-6α-fluoro-21-hydroxy-16α-methylpregna-1,3,5-triene-11,20-dione 21-acetate.
- B₆₁... 3-methoxy-6α-fluoro-11,21-dihydroxy-16α-methylpregna-1,3,5-trien-20-one 21-acetate.
- B₆₂... 3-ethoxy-11β,17α,21-trihydroxypregna-3,5-dien-20-one 21-acetate.
- B₆₃... 3-ethoxy-6-fluoro-19-nor-17α-pregna-3,5-dien-20-yn-17β-ol acetate.

[1] Preparation of corresponding 3-keto-Δ¹,⁴-steroid is carried out as follows: 10 g. of 6α,9α-difluoroprednisolone 17-propionate, described in British Pat. 1,202,001 Example 1, are dissolved in 100 ml. pyridine:methylene chloride (1:1), cooled to 0° C. then 15 g. p-toluensulfonic acid-dissolved in 100 ml. pyridine:methylene chloride (1:1) are added and the mixture is allowed to rest overnight at 0-5° C. 6α,9α-difluoro-11β,17α,21-trihydroxypregna-1,4-diene 17-propionate 21-tosylate melting at 205–207° C. thus obtained is dissolved in acetone, treated with 25 g. sodium iodide, refluxed for 24 hours; then 32,75 ml. acetic acid are added and further refluxed for one hour. The mixture is diluted with a 10% aqueous sodium acid sulfite, concentrated under vacuum and extracted with methylene chloride. Removal of the solvent followed by recrystallization from methylene chloride:ether afforded 7.4 g. of 6α,9α-difluoro-11β,17α-dihydroxypregna-1,4-diene-3,20-dione 17-propionate melting at 235–237° C.

EXAMPLE 1

3α-(17'β-propionoxyestra-3',5'-dien-3'-yloxy)-5β-androstan-17-one

A solution of 5 g. 3α-hydroxy-5β-androstan-17-one (A₁₃) and 5 g. 3-ethoxyestra-3,5-dien-17β-ol (B₅) propionate in 3000 ml. anhydrous benzol containing 100 mg. pyridine tosylate was distilled for 90 minutes until the volume of the solution was reduced to 200–300 ml. After addition of some drops of pyridine the solvent was removed under vacuum and the residue, taken up with methanol, crystallized to give 4.72 g. 3α-(17'β-propionoxyestra-3',5'-dien-3'-yloxy)-5β-androstan-17-one melting at 206–209° C. A crystallization from methylene chloride-methanol gives the analytical sample melting at 210–212° C., $[\alpha]_D^{25°} = -3°$ (c.=1, dioxane).

In accordance with the above procedure the following disteroidyl ethers are obtained.

| Ex. | Name | Preparation from— |
|---|---|---|
| 2 | 3β-(17'α-acetoxy-20'-oxopregna-3',5'-dien-3'-yloxy)-17α-hydroxypregn-5-en-20-one acetate | A₃ and B₃. |
| 3 | 3β-(17'β-enanthoxy-19'-nor-17'α-pregna-3',5'-dien-20'-yn-3'-yloxy)-19-nor-17α-pregn-5-en-20-yn-17β-ol enanthate | A₄ and B₄. |
| 4 | 3β-(17'β-acetoxy-19'-nor-17'α-pregna-3',5'-dien-20'-yn-3'-yloxy)-17α-hydroxypregn-5-en-20-one acetate | A₃ and B₂. |
| 5 | 3β-(17'β-propionoxyestra-3',5'-dien-3'-yloxy)-5α-androst-1-en-17β-ol acetate | A₅ and B₅. |
| 6 | 3β-(17'β-propionoxyestra-3',5'-dien-3'-yloxy)-5α-androstan-17-one | A₆ and B₅. |
| 7 | 3β-(17'β-acetoxy-19'-nor-17'α-pregna-3',5'-dien-20'-yn-3'-yloxy)-19-nor-17α-pregn-5-en-20-yn-17β-ol acetate | A₈ and B₂. |
| 8 | 3β-(17'-propionoxyestra-3',5'-dien-3'-yloxy)-17α-hydroxypregn-5-en-20-one acetate | A₃ and B₅. |
| 9 | 3α-(11',20'-dioxo-17'α-hydroxy-21'-acetoxypregna-1',3',5'-trien-3'-yloxy)-5α-androstan-17β-ol acetate | A₁₆ and B₇. |
| 10 | 3α-(17'β-propionoxyestra-3',5'-dien-3'-yloxy)-5α-androstan-17-one | A₁₂ and B₅. |
| 11 | 3α-(17'β-acetoxy-19'-nor-17'α-pregna-3',5'-dien-20'-yn-3'-yloxy)-5α-androstan-17-one | A₁₂ and ₂. |
| 12 | 3α-(17'β-acetoxy-19'-nor-17'α-pregna-3',5'-dien-20'-yn-3'-yloxy)-5β-androstan-17-one | A₁₃ and B₂. |
| 13 | 3β-(20'-oxo-19'-norpregna-3',5'-dien-3'-yloxy)-pregn-5-en-20-one | A₇ and B₉. |
| 14 | 3β-(17'β-enanthoxy-19'-nor-17'α-pregna-3',5'-dien-20'-yn-3'-yloxy)-pregn-5-en-20-one | A₇ and B₄. |
| 15 | 3β-(6'-chloro-17'α-acetoxy-20'-oxopregna-3',5'-dien-3'-yloxy)-pregn-5-en-20-one | A₇ and B₁₀. |
| 16 | 3β-(17'β-benzoyloxy-19'-nor-17'α-pregna-3',5'-dien-20'-yn-3'-yloxy)-pregn-5-en-20-one | A₇ and B₁₁. |
| 17 | Methyl-(17'β-acetoxy-19'-nor-17'α-pregna-3',5'-dien-20'-yn-3'-yloxy)-12α-acetoxy-5β-cholan-24-oate | A₁₅ and B₂. |
| 18 | 3β-(17'β-acetoxy-13'-ethyl-17'α-ethinylgona-3',5'-dien-3'-yloxy)-pregn-5-en-20-one | A₇ and B₁₂. |
| 19 | 3β-(17'β-acetoxy-21'-methylene-19'-nor-17'α-pregna-3',5'-dien-3'-yloxy)-pregn-5-en-20-one | A₇ and B₁₃. |
| 20 | 3β-(17'α-acetoxy-20'-oxo-6'-methylpregna-3',5'-dien-3'-yloxy)-pregn-5-en-20-one | A₇ and B₄₉. |
| 21 | 3β-(17'β-acetoxy-17'α-methylestra-3',5'-dien-3'-yloxy)-pregn-5-en-20β-ol acetate | A₁₇ and B₁₄. |
| 22 | 3β-(9'α-fluoro-11',20'-dioxo-17'α-hydroxy-21'-acetoxy-16'β-methylpregna-1',3',5',-trien-3'-yloxy)-androst-5-en-17-one | A₁ and B₁₆. |
| 23 | 3β-(17'-acetoxyandrosta-3',5'-dien-3'-yloxy)-androst-4-ene-6,17-dione | A₁₈ and B₁₇. |
| 24 | 3β-(17'-oxoestra-3',5'-dien-3'-yloxy)-pregn-5-en-20α-ol acetate | A₁₉ and B₁₅. |
| 25 | 3β-(17'β-acetoxy-21'-methylene-19'-nor-17'α-pregna-3',5'-dien-3'-yloxy)-pregn-5-en-20α-ol acetate | A₁₉ and B₁₃. |
| 26 | 3β-(9'α-fluoro-11',20'-dioxo-17'α-hydroxy-21'-acetoxy-16'β-methylpregna-1',3',5'-trien-3'-yloxy)-21-hydroxypregn-5-en-20-one 21-acetate. | A₂₁ and B₁₆. |
| 27 | 3α-(9'α-fluoro-11',20'-dioxo-17'α-hydroxy-21'-acetoxy-16'β-methylpregna-1',3',5'-trien-3'-yloxy)-5β-androstan-17-one | A₁₃ and B₁₆. |
| 28 | 3β-(17'β-acetoxy-1'-methyl-5'α-androsta-1',3'-dien-3'-yloxy)-5α-androstan-17-one | A₁₂ and B₂₄. |
| 29 | 3β-(9'α-fluoro-11'β-hydroxy-17'β-acetoxy-17'α-methylandrosta-3',5'-dien-3'-yloxy)-androst-5-en-17-one | A₁ and B₂₅. |
| 30 | 3β-(11',20'-dioxo-17'α-acetoxy-5'β-pregn-3'-en-3'-yloxy)-21-hydroxypregn-5-en-20-one acetate | A₂₁ and B₂₈. |
| 31 | 3β-(17'α-acetoxy-20'-oxo-16'-methylenepregna-3',5'-dien-3'-yloxy)-pregn-5-en-20-one | A₇ and B₂₉. |
| 32 | 3β-(16'α,17'α-[1''-methylbenzylidenedioxy)-20'-oxopregna-3',5'-dien-3'-yloxy]-pregn-5-en-20α-ol acetate | A₁₉ and B₃₀. |
| 33 | 3β-(11'β,17'A-dihydroxy-20'-oxo-21'-acetoxypregna-3',5'-dien-3'-yloxy)-21-hydroxypregn-5-en-20-en 21-acetate | A₂₁ and B₆₂. |
| 34 | 3β-(9'α,11'β-dihydroxy-17'α-hydroxy-20'-oxo-21'-acetoxypregna-1',3',5'-trien-3'-yloxy)-androst-5-en-17-one | A₁ and B₃₁. |
| 35 | 3β-(9'α,11'β-dichloro-17'α-hydroxy-20'-oxo-21'-acetoxy-16'α-methylpregna-1',3',5'-trien-3'-yloxy)-19-norpregn-5-en-20-one | A₂₆ and B₃₅. |
| 35 | 3β-(9'α,11'β-dichloro-17'α-hydroxy-20'-oxo-21'-acetoxy-16'β-methylpregna-1',3',5'-trien-3'-yloxy)-19-norpregn-5-en-20-one | A₂₆ and B₃₆. |
| 36 | 3β-(9'α-11'β-dichloro-17'α-hydroxy-20'-oxo-21'-acetoxy-16'β-methylpregna-1',3',5'-trien-3'-yloxy)-19-norpregn-5-en-20-one | A₂₆ and B₃₆. |
| 37 | 3β-(9'α-fluoro-11'β,17'α-dihydroxy-20'-oxo-21'-acetoxy-16'α-methylpregna-1',3',5'-trien-3'-yloxy)-17α-hydroxy-19-nor-pregn-5-en-20-one 17-acetate | A₂₇ and B₃₇. |
| 38 | 3β-(9'α-fluoro-11',20'-dioxo-17'α,21'-diacetoxy-16'α-methylpregna-1',3',5'-trien-3'-yloxy)-17α-hydroxypregn-5-en-20-one acetate | A₃ and B₃₈. |
| 39 | 3α-(9'α-fluoro-11'β-hydroxy-20'-oxo-21'-acetoxy-16'α-methylpregna-1',3',5'-trien-3'-yloxy)-5β-androstan-17-one | A₁₃ and B₃₉. |
| 40 | 3β-(9'α-fluoro-11'β-hydroxy-17'α,21'-diacetoxy-20'-oxo-16'β-methylpregna-1',3',5'-trien-3'-yloxy)-5α-androst-1-en-17β-ol 17-acetate | A₅ and B₄₀. |
| 41 | 3β-(9'α-fluoro-11'β,17'α-dihydroxy-20'-oxo-21'-acetoxy-16'-methylenepregna-1',3',5'-trien-3'-yloxy)-androst-5-en-17-one | A₁ and B₄₁. |
| 42 | 3β-(6'α-fluoro-11',20'-dioxo-16'α,17'α-isopropylidenedioxy-21'-acetoxypregna-1',3',5'-trien-3'-yloxy)-5α-androst-1-en-17β-ol acetate | A₅ and B₄₅. |
| 43 | 3α-(6'α-fluoro-11'β-hydroxy-16'α,17'α-isopropylidenedioxy-20'-oxo-21'-acetoxypregna-1',3',5'-trien-3'-yloxy)-5β-pregnan-20-one | A₁₁ and B₄₆. |

| Ex. | Name | Preparation from— |
|---|---|---|
| 44 | 3β-(6'α,9'α-difluoro-11'β-hydroxy-17'α,21'-diacetoxy-20'-oxopregna-1',3',5'-trien-3'-yloxy)-pregn-5-en-20-one | A₇ and B₄₇. |
| 45 | 3α-(6'α,9'α-difluoro-11',20'-dioxo-17'α-hydroxy-21'-acetoxypregna-1',3',5'-trien-3'-yloxy)-5β-androstan-17-one | A₁₃ and B₄₈. |
| 46 | 3β-(6'α,9'α-difluoro-11',20'-dioxo-17'α,21'-diacetoxypregna-1',3',5'-trien-3'-yloxy)-androst-5-en-17-one | A₁ and B₅₁. |
| 47 | 3α-(6'α,9'α-difluoro-11'β-hydroxy-17'α-propionoxy-20'-oxopregna-1',3',5'-trien-3'-yloxy)-5α-androstan-17β-ol acetate | A₁₆ and B₅₂. |
| 48 | 3β-(6'α,9'α-difluoro-11',20'-dioxo-17'α-propionoxypregna-1',3',5'-trien-3'-yloxy)-21-hydroxypregn-5-en-20-one acetate | A₂₁ and B₅₃. |
| 49 | 3-(17'α-acetoxy-20'-oxopregn-5'-en-3'-β-yloxy)-7α-mercapto-17α-pregna-3,5-diene-21,17β-carbolactone acetate | A₃ and B₅₅. |
| 50 | 3-(19'-nor-20'-oxopregn-5'-en-3'β-yloxy)-19-nor-17α-pregna-3,5-diene-21,17β-carbolactone | A₂₃ and B₅₇. |
| 51 | 3-(17'α-acetoxy-19'-nor-20'-oxopregn-5'-en-3'β-yloxy)-7α-mercapto-19-nor-17α-pregna-3,5-diene-21,17β-carbolactone acetate | A₂₇ and B₅₈. |
| 52 | 3β-(6'α-fluoro-11',20'-dioxo-21'-acetoxy-16'α-methylpregna-1',3',5'-trien-3'-yloxy)-androst-5-en-17-one | A₁ and B₆₀. |
| 53 | 3β-(6'α-fluoro-11'β-hydroxy-20'-oxo-21'-acetoxy-16'α-methylpregna-1',3',5'-trien-3'-yloxy)-androst-4-ene-6,17-dione | A₁₈ and B₆₁. |

3β-(17'β-acetoxy-19'-nor - 17'α-pregna-3',5'-dien-20'-yn-3'-yloxy)-9-nor-17α - pregn-5-en-20-yn-17β-ol acetate (Ex. 7) is a high antigonadotrophic agent and shows ovarian inhibition and antiuterotrophic activity. It is active by oral route. As progestinic agent, it is twice as active as the parent steroid on Clauberg test. The compound possess high contraceptive activity and antifertility effect upon oral administration.

3β-(17'β-propionoxyestra-3',5'-dien - 3' - yloxy)-5α-androstan-17-one (Ex. 6) is more active than 19-nortestosterone propionate as oral myogenic agent.

3β-(17'α-acetoxy-20'-oxo - 6' - methylpregna-3',5'-dien-3'-yloxy)-pregn-5-en-20-one (Ex. 20) shows long-lasting oral activity and high endometrial stimulation.

(B₆) were added to 100 cc. dimethylformamide containing 125 mg. pyridine tosylate.

A slow nitrogen stream was bubbled in the mixture which was heated to 175° C. for 60 minutes.

After addition of some drops of pyridine, the residue was dried under vacuum and taken up with methanol crystallizes to give 4 g. 3β-(17'β-acetoxy-19'-nor-17'α-pregna-3',5'-dien - 20'-yn-3'-yloxy) - pregn-5-en-20-one melting at 225–228° C. By crystallization from methylene chloride-methanol the analytical sample melting at 232–234° C.; $[\alpha]_D^{25°}= -132°$ (c.=1, dioxane) was obtained.

In accordance with the above procedure the following disteroidyl ethers are obtained.

| Ex. | Name | Preparation from— |
|---|---|---|
| 55 | 3β-(17'β-propionoxy-5'α-androst-2'-en-3'-yloxy)-androst-5-en-17-one | A₁ and B₁. |
| 56 | 3β-(17'β-acetoxy-19'-nor-17'α-pregna-3',5'-dien-20'-yn-3'-yloxy)-androst-5-en-17-one | A₁ and B₂. |
| 57 | 3α-(20'-oxo-5β-pregn-3'-en-3'-xyloy)-5β-pregnan-20-one | A₁₁ and B₈. |
| 58 | 3β-17'β-propinoxyestra-3'',5'-dien-3'-yloxy)-androst-5-en-17-one | A₁ and B₅. |
| 59 | 3β-(17'β-acetoxy-19'-nor-17α-pregna-3',5'-dien-20'-yn-3'-yloxy)-cholest-5-ene | A₁₄ and B₂. |
| 60 | 3β-(17'-oxoestra-3',5'-dien-3'-yloxy)-pregn-5-en-20β-ol acetate | A₁₇ and B₁₅. |
| 61 | 3α-(20'-oxo-21'-acetoxy-5'β-pregn-3'-en-3'-yloxy)-5β-pregnan-20-one | A₁₁ and B₁₈. |
| 62 | 3α-(20'-oxo-21'-acetoxy-5'α-pregnan-2'-en-3'-yloxy)-5α-pregn-20-one | A₂₀ and B₁₉. |
| 63 | 3α-(17'β-propionoxyandrost-3'-en-3'-yloxy)-5β-androstan-17-one | A₁₃ and B₂₂. |
| 64 | 3α-(20'-oxo-5'α-pregn-2'-en-3'-yloxy)-5α-pregnan-20-one | A₂₆ and B₂₆. |
| 65 | 3α-(11',20'-dioxo-5'β-pregn-3'-en-3'-yloxy)-5β-pregnan-20-one | A₁₁ and B₂₇. |
| 66 | 3α-(17'β-acetoxy-6'α,21'-dimethyl-17'α-pregna-3',5'-dien-20'-yn-3'-yloxy)-5β-pregnan-20-one | A₁₁ and B₃₁. |
| 67 | 3β-(20'-oxo-21'-acetoxypregna-3',5'-dien-3'-yloxy)-21-hydroxypregn-5-en-20-one acetate | A₂₁ and B₅₄. |
| 68 | 3β-(17'-oxoandrosta-3',5'-dien-3'-yloxy)-androst-5-en-17-one | A₁ and B₅₀. |

3α-(17'β-acetoxy-19'-nor - 17'α - pregna-3',5'-dien-20'-yn-3'-yloxy)-5α-androstan-17-one (Ex. 11), 3α-(17'β-acetoxy-19'-nor-17'α-pregna - 3',5'-dien - 20'-yn-3'-yloxy)-5β-androstan-17-one (Ex. 12) show antiuterotrophic activity and are more active than norethindrone acetate. They have endometrial activity as measured on Clauberg test and are twice as active as norethindrone acetate.

3α-(17'β-acetoxy-19' - nor-17'α-pregna - 3',5'-dien-20'-yn-3'-yloxy)-5α-androstan-17-one (Ex. 11) is also an orally active myoandrogenic agent.

3β-(17'β-enanthoxy-19'-nor-17'α - pregna - 3',5'-dien-20'yn-3'-yloxy)-pregn-5-en-20-one (Ex. 14) and shows progestinic activity and is a high lipophilic agent: thus it shows long-lasting effect.

3β-(17'α-acetoxy-20'-oxo-pregna - 3',5'-dien-3'-yloxy)-17α-hydroxypregn-5-en-20-one acetate (Ex. 2) is an orally active progestinic, more potent than 17α-acetoxyprogesterone.

3β-(17'β-acetoxy-19'-nor-17'α - pregna-3',5'-dien-20'-yn-3'-yloxy)-17α-hydroxypregn-5-en-20-one acetate (Ex. 4) is a progestinic agent twice more active than norethindrone acetate. Also antigonadotrophic agent with stimulatory activity.

3β-(17'β-propionoxyestra-3',5'-dien - 3'-yloxy)-17α-hydroxypregn-5-en-20-one acetate (Ex. 8) shows an interesting androgenic and myogenic activity.

EXAMPLE 54

3β-(17'β-acetoxy-19'-nor-17'α-pregna-3',5'-dien-20'-yn-3'-yloxy)-pregn-5-en-20-one 5 g. 3β-hydroxypregn-5-en-20-one (A₇) and 5.5 g. 3-ethoxy-19-nor-17α-pregna-3,5 - dien-20-yn-17β-ol acetate 3β-(17'β-acetoxy-19'-nor-17'α-pregna - 3',5' - dien-20'-yn-3'-yloxy)-androst-5-en-17-one (Ex. 56) shows antiuterotrophic activity, more active than norethindrone acetate. As progestinic agent is twice as active as the parent steroid on Clauberg test. Contraceptive activity and antifertility upon oral administration.

3β-(17'β-acetoxy-19'-nor - 17'α - pregna-3',5'-dien-20'-yn-3'-yloxy)-pregn-5-en-20-one (Ex. 54) is an antigonadotrophic agent and shows ovarian inhibition and antiuterotrophic acivity. Also orally active progestinic agent, twice as actvie as the parent steroid on Clauberg test.

EXAMPLE 69

3β-(17'β-acetoxy-19'-nor-17'α-prena-3',5'-dien-20'-yn-3'-yloxy)-estra-1,3,5(10)-trien-17-one A solution of 7 g. estrone (A₉) and 7 g. of 3-ethoxy-19-nor-17α-pregna-3,5-dien-20-yn-17β-ol acetate (B₂) in 5000 cc. anhydrous benzene containing 200 mg. p.toluenesulfonic acid, was distilled for 150 minutes until the volume of the solution was reduced to 400–500 cc. After addition of some drops of pyridine, the solvent was removed under vacuum and the residue was chromatographed on neutral alumina. By crystallization from methanol of the fractions eluted with benzene-hexane (8:2), 2.24 g. of analytical pure 3-(17'β-acetoxy-19'-nor-17'α-pregna-3',5'-dien-20'yn-3'-yloxy)-estra - 1,3,5(10) - trien-17-one were obtained, melting at 260–265° C., $$[\alpha]_D^{25°}=-73.2°$$

(c.=1, dioxane).

In accordance with the above procedure the following disteroidyl ethers are obtained.

| Ex. | Name | Preparation from— |
|---|---|---|
| 70 | 3-(17'β-acetoxy-19'-nor-17'α-pregna-3',5'-dien-20'-yn-3'-yloxy)-estra-1,3,5(10)-trien-17β-ol propionate | $A_2$ and $B_2$ |
| 71 | 3-(17-β-acetoxy-19'-nor-17'α-pregna-3',5'-dien-20'-yn-3'-yloxy)-17α-ethinylestra-1,3,5(10)-trien-17β-ol acetate | $A_{10}$ and $B_2$ |
| 72 | 3-(11'β,17'α-dihydroxy-20'-oxo-21'-acetoxypregna-1',3',5'-trien-3'-yloxy)-estra-1,3,5(10)-trien-17β-ol 17-propionate | $A_2$ and $B_{33}$ |
| 73 | 3-(9'α-fluoro-11',20'-dioxo-17'α,21'-diacetoxy-16'-methylenepregna-1',3',5'-trien-3'-yloxy)-estra-1,3,5(10)-trien-17-one | $A_9$ and $B_{42}$ |
| 74 | 3-(9'α-fluoro-11',20'-dioxo-16'α,17'α-isopropylidenedioxy-21'-acetoxypregna-1',3',5'-trien-3'-yloxy)-estra-1,3,5(10)-trien-17β-ol acetate | $A_{22}$ and $B_{43}$ |
| 75 | 3-(6'α-fluoro-11'β-hydroxy-16'α,17'α-isopropylidene-20'-oxo-21'-acetoxypregna-3',5'-dien-3'-yloxy)-estra-1,3,5(10)-trien-17α-ol 17-acetate | $A_{33}$ and $B_{44}$ |
| 76 | 3-(17'β-propionoxyestra-1',3',5'(10'-trien-3'-yloxy)-17α-pregna-3,5-diene-21,17β-carbolactone | $A_2$ and $B_{55}$ |
| 77 | 3-(17'β-hydroxy-11'β-methyl-19'-nor-17'α-pregna-3',5'-dien-20'-yn-3'-yloxy)-estra-1,3,5(10)-trien-17α-ol 17-acetate | $A_{33}$ and $B_{59}$ |
| 78 | 3-(11',20'-dioxo-17'α-hydroxy-21'-acetoxypregna-3',5'-dien-3'-yloxy)-estra-1,3,5(10)-trien-17α-ol 17-acetate | $A_{33}$ and $B_{32}$ |

3-(17'β-acetoxy-19'-nor-17'α-pregna-3',5' - dien - 20'-yn-3'-yloxy)-estra-1,3,5(10)-trien-17β-ol propionate (Ex. 70) displays a contraceptive-sterilizing activity much higher than that of norethindrone enanthate, still evident in mature female mice 6 months after a single injection.

3-(17'β-acetoxy-19'-nor-17'α-pregna-3',5' - dien - 20'-yn-3'-yloxy)-17α-ethinylestra-1,3,5(10)-trien-17β-ol acetate (Ex. 71) displays an interesting long lasting oral uterotrophic activity as high as that of quinestrol.

EXAMPLE 79

3β-(17'β-acetoxy-19'-nor-17'α-pregna-3',5'-dien-20'-yn-3'-yloxy)-pregn-5-en-20β-ol To a solution of 1.7 g. sodium borohydride in 7 cc. water, externally cooled with an ice and water bath, 6.7 g. 3β-(17'β-acetoxy-19'-nor-17'α-pregna - 3',5' - dien-20'-yn-3'-yloxy)-pregn-5-en-20-one dissolved in 130 cc. tetrahydrofurane were added. The mixture was kept under stirring overnight at room temperature and the solution was then concentrated under vacuum, poured into water and the precipitate filtered to give 6.1 g. 3β-(17'-β-acetoxy-19'-nor-17'α-pregna-3',5'-dien-20'-yn - 3' - yloxy)-pregn-5-en-20β-ol melting at 210–215° C. A crystallization from methylene chloride-methanol gives the analytical sample melting at 214–216° C., $[\alpha]_D^{25°} = -140°$ (c.=1, dioxane).

In accordance with the above procedure the following disteroidyl ethers are obtained.

berg test. The compound possesses a high contraceptive activity and antifertility effect upon oral administration.

EXAMPLE 89

3β-(17'β-hydroxy-19'-nor-17'α-pregna-3',5'-dien-20'-yn-3'-yloxy)-pregn-5-en-20-one To a solution of 11.7 g. 3β-(17'β-acetoxy-19'-nor-17'α-pregna-3',5'-dien-20'-yn-3'-yloxy)-pregn-5-en-20-one (Ex. 54) in 730 cc. methylene chloride and 230 cc. methanol, 485 cc. of a 5% methanolic potassium hydroxide solution were added. The mixture was then refluxed in nitrogen atmosphere for 6 hours, then the solution concentrated under vacuum, diluted with water and the precipitate filtered. A crystallizaiton from methylene chloride-methanol gives 8.79 g. 3β-(17'β-hydroxy-19'-nor-17'α-pregna-3',5'-dien-20'-yn-3'-yloxy)-pregn-5-en-20-one analytically pure, melting at 270–273° C., $[\alpha]^D{}_{25°} = -142°$ (c.=1, dioxane).

In accordance with the above procedure the following disteroidyl ethers are obtained.

| Ex. | Name | Preparation from end-product of— |
|---|---|---|
| 90 | 3β-(17'β-hydroxy-19'-nor-17'α-pregna-3',5'-dien-20'-yn-3'-yloxy)-androst-5-en-17β-ol | Example 81. |
| 91 | 3α-17'β-hydroxy-19'-nor-17'α-pregna-3',5'-dien-20'-yn-3'-yloxy)-12α-hydroxy-5β-cholan-24-oic, potassium salt | Example 17. |
| 92 | 3β-(17'β-hydroxy-13'β-ethyl-17'α-ethinylgona-3',5'-dien-3'-yloxy)-pregna-5-en-20-one | Example 18. |
| 93 | 3β-(17'β-hydroxy-21'-methylene-19'-nor-17'α-pregna-3',5'-dien-3'-yloxy)-pregn-5-en-20β-one | Example 19. |
| 94 | 3β-(17'β-hydroxy-17'α-methylestra-3',5'-dien-3'-yloxy)-pregn-5-en-20β-ol | Example 21. |
| 95 | 3β-(17'-oxoestra-3',5'-dien-3'-yloxy)-pregn-5-en-20β-ol | Example 60. |
| 96 | 3β-(17'β-hydroxy-19'-nor-17'α-pregna-3',5'-dien-20'-yn-3'-yloxy)-19-nor-17α-pregn-5-en-20-yn-17β-ol | Example 7. |
| 97 | 3β-(17'-oxoestra-3',5'-dien-3'-yloxy)-pregn-5-en-20α-ol | Example 24. |
| 98 | 3β-(17'β-hydroxy-21'-methylene-19'-nor-17'α-pregna-3',5'-dien-3'-yloxy)-pregn-5-en-20α-ol | Example 25. |
| 99 | 3β-[16'α,17'α-(1''-methyl-benzylidenedioxy)-20'-oxopregna-3',5'-dien-3'-yloxy]-pregn-5-en-20α-ol | Example 32. |

3β-(17'β-hydroxy - 19' - nor-17'α-pregna-3',5'-dien-20'-yn-3'-yloxy)-androst-5-en-17β-ol (Ex. 90) shows an antiuterotrophic activity higher than that of norethindrone acetate. Its endometrial activity as measured on Clauberg test is twice as high as that of norethindrone acetate. The compound displays also a very high antigonadotrophic activity when administered by oral route in parabiotic rats.

| Ex. | Name | Preparation from end-product of— |
|---|---|---|
| 80 | 3β-(17'β-propionoxyestra-3',5'-dien-3'-yloxy)-5α-androstan-17β-ol | Example 6. |
| 81 | 3β-(17'β-acetoxy-19'-nor-17'α-pregna-3',5'-dien-20'-yn-3'-yloxy)-androst-5-en-17β-ol | Example 56. |
| 82 | 3β-(17'β-enanthoxy-19'-nor-17'α-pregna-3',5'-dien-20'-yn-3'-yloxy)-pregn-5-en-20β-ol | Example 14. |
| 83 | 3β-(17'β-benzoyloxy-19'-nor.17'α-pregna-3',5'-dien-20'-yn-3'-yloxy)-pregn-5-en-20β-ol | Example 16. |
| 84 | 3β-(17'β-hydroxy-19'-nor-17'α-pregna-3',5'-dien-20'-yn-3'-yloxy)-pregn-5-en-20β-ol | Example 89. |
| 85 | 3β-(17'β-hydroxy-21'-methylene-19'-nor-17'α-pregna-3',5'-dien-3'-yloxy)-pregn-5-en-20β-ol | Example 93. |
| 86 | 3β-(17'α-acetoxy-20'-oxo-16'-methylenepregna-3',5'-dien-3'-yloxy)-pregn-5-en-20β-ol | Example 31. |
| 87 | 3α-(17'β-acetoxy-6'α,21'-dimethyl-17'α-pregna-3',5'-dien-20'-yn-3'-yloxy)-5β-pregnan-20β-ol | Example 66. |
| 88 | 3β-(17'α-acetoxy-20'-oxo-6'-methylpregna-3',5'-dien-3'-yloxy)-pregn-5-en-20β-ol | Example 20. |

3β-(17'β-enanthoxy-19'-nor-17'α-pregna - 3',5' - dien-20'-yn-3'-yloxy)-pregn - 5 - en - 20β-ol (Ex. 82) shows a good progestinic activity.

3β-(17'β-hydroxy-21'-methylene - 19' - nor-17'α-pregna-3',5'-dien-3'-yloxy)-pregn - 5 - en-20β-ol (Ex. 85) displays a significant activity by oral route in maintaining pregnancy in rats.

3β-(17'β-acetoxy - 19' - nor-17'α-pregna-3',5'-dien - 20'-yn-3'-yloxy)-androst-5-en-17β-ol (Ex. 81) is a high antigonadotrophic agent, shows ovarian inhibition and antiuterotrophic activity. Active by oral route. As progestinic agent, it is twice as active as the parent steroid on Clau- 3β-(17'β-hydroxy - 19' - nor-17'α-pregna-3',5'-dien-20'-yn-3'-yloxy)-pregn-5-en-20-one (Ex. 89) and 3β-(17'β-hydroxy-13'β-ethyl-17'α - ethinylgona-3',5'-dien-3'-yloxy)-pregna-5-en-20-one (Ex. 92) have a significant endometrial activity as measured in Clauberg test.

3β-(17'β-hydroxy - 19' - nor-17'α-pregna-3',5'-dien-20'-yn-3'-yloxy)-19-nor-17α-pregn-5-en-20-yn-17β-ol (Ex. 96) possess a significant contraceptive activity. Experiments were carried out by weekly administration to female rats caged with males for three weeks.

EXAMPLE 100

3β-(9'α-fluoro - 11',20' - dioxo - 17'α,21'-dihydroxy-16'β-methylpregna-1',3',5'-trien-3-yloxy) - androst-5-en-17-one A solution of 1.86 g. of 3β-(9'α-fluoro-11',20'-dioxo-17'α-hydroxy - 21' - acetoxy-16'β-methylpregna-1',3',5'-trien-3'-yloxy)-androst-5-en-17-one (Ex. 22) in 90 ml. of tetrahydrofuran and 90 ml. of methanol kept under nitrogen, was treated with 1.86 ml. of 1 M methanol solution of sodium methoxide. After stirring at room temperature for 20 minutes, the solvent was evaporated under reduced pressure and the residue taken up with water and filtered. A crystallization from methylene chloride-methanol gave 1.24 g. of crystal of 3β-(9'α-fluoro-11',20'-dioxo-17'α,21'-dihydroxy - 16'β - methylpregna - 1',3',5'-trien-3'-yloxy)-androst-5-en-17-one, melting at 260–264° C., $[\alpha]^D_{25°}= -77°$ (c.=1, dioxane).

In accordance with the above procedure the following disteroidyl ethers are obtained.

yloxy)-androst-5-en-17-one (Ex. 100) and 4.2 g. of succinil anhydride in 50 ml. of pyridine was kept overnight at room temperature. The mixture was then poured into 480 ml. of saturated salt solution and extracted with ether. The organic layer was separated, dried on anhydrous sodium sulfate and the solvent removed under reduced pressure. The residue was crystallized from methylene chloride-methanol to give 950 mg. of crystals of 3β-(9'α - fluoro - 11',20' - dioxo-17'α-hydroxy-21'-hemisuccinoxy - 16'β - methylpregna - 1',3',5' - trien - 3' - yloxy)-androst-5-en-17-one, melting at 151–153° C. $[\alpha]^D_{250}= -46$ (c.=0.5, dioxane).

In accordance with the above procedure using instead of succinic anhydride, the anhydride of the acetic, propionic, butirric, valeric, enanthic, caproic, benzoic, malonic, phthalic and glutaric acid and instead of 3β-(9'α-fluoro-11',20' - dioxo - 17',21'-dihydroxy-16'β-methylpregna-1',3',5'-trien-3'-yloxy)-androst-5-en-17-one any 21-hydroxy free disteroidyl ether obtained by any preceding example the corresponding 21-ester may be prepared. In particular the following disteroidyl ethers are obtained.

| Ex. | Name | Preparation from end-product of— |
|---|---|---|
| 101 | 3α-(20'-oxo-21'-hydroxy-5'β-pregn-3'-en-3'-yloxy)-5β-pregnan-20-one | Example 61. |
| 102 | 3α-(20'-oxo-21'-hydroxy-5'α-pregn-2'-en-3'-yloxy)-5α-pregnan-20-one | Example 62. |
| 103 | 3β-(9'α-fluoro-11',20'-dioxo-17'α,21'-dihydroxy-16'β-methylpregna-1',3',5'-trien-3'-yloxy)-21-hydroxy-pregn-5-en-20-one | Example 26. |
| 104 | 3β-(11'β,17'α,21'-trihydroxy-20'-oxopregna-3',5'-dien-3'-yloxy)-21-hydroxypregn-5-en-20-one | Example 33. |
| 105 | 3β-(9'α,11'β-dichloro-17'α,21'-dihydroxy-20'-oxopregna-1',3',5'-trien-3'-yloxy)-androst-5-en-17-one | Example 34. |
| 106 | 3β-(9'α,11'β-dichloro-17'α,21'-dihydroxy-20'-oxo-16'β-methylpregna-1',3',5'-trien-3'-yloxy)-19-norpregn-5-en-20-one | Example 36. |
| 107 | 3β-(9'α-fluoro-11'β,17'α,21'-trihydroxy-20'-oxo-16'-methylenepregna-1',3',5'-trien-3'-yloxy)-androst-5-en-17-one | Example 41. |
| 108 | 3-(9'α-fluoro-11',20'-dioxo-17'α,21'-dihydroxy-16'-methylenepregna-1',3',5'-trien-3'-yloxy)-estra-1,3,5(10)-trien-17-one | Example 73. |
| 109 | 3α-(6'α,9'α-difluoro-11',20'-dioxo-17'α,21'-dihydroxypregna-1',3',5'-trien-3'-yloxy)-5β-androstan-17-one | Example 45. |
| 110 | 3β-(6'α,9'α-difluoro-11',20'-dioxo-17'α-propionoxypregna-1',3',5'-trien-3'-yloxy)-21-hydroxypregn-5-en-20-one | Example 48. |
| 111 | 3-(11',20°-dioxo-17'α,21'-dihydroxypregna-3',5'-dien-3'-yloxy)-estra-1,3,5(10)-trien-17α-ol 17-acetate | Example 78. |

EXAMPLE 112

3β - (9'α - fluoro-11',20'-dioxo-17'α-hydroxy-21'-hemisuccinoxy-16'β-methylpregno - 1',3',5' - trien-3'-yloxy)-androst-5-en-17-one A solution of 1.4 g. of 3β-(9'α-fluoro-11',20'-dioxo-17',21'-dihydroxy - 16'β - methylpregna - 1',3',5' - trien-3'-yloxy)-androst-5-en-17-one (Ex. 112) possess a very high oral long-lasting antiinflammatory activity in granuloma pouch test.

| Ex. | Name | Preparation from end-product of— |
|---|---|---|
| 113 | 3α-(20'-oxo-21'-hemisuccinoxy-5'β-pregn-3'-en-3'-yloxy)-5β-pregnan-20-one | Example 101. |
| 114 | 3α-(20'-oxo-21'-hemisuccinoxy-5'α-pregn-2'-en-3'-yloxy)-5α-pregnan-20-one | Example 102. |
| 115 | 3β-(9'α-fluoro-11',20'-dioxo-17'α-hydroxy-21'-hemisuccinoxy-16'β-methylpregna-1',3',5'-trien-3'-yloxy)-21-hydroxypregn-5-en-20-one 21-hemisuccinate. | Example 103. |
| 116 | 3β-(11'β,17'α-dihydroxy-20'-oxo-21'-hemisuccinoxypregna-3',5'-dien-3'-yloxy)-21-hydroxypregn-5-en-20-one 21-hemisuccinate | Example 104. |
| 117 | 3β-(9'α,11'β-dichloro-17'α-hydroxy-20'-oxo-21'-hemisuccinoxy-16'β-methylpregna-1',3',5'-trien-3'-yloxy)-19-norpregn-5-en-20-one | Example 106. |
| 118 | 3β-(6'α,9'α-difluoro-11',20'-dioxo-17'α-propionoxypregna-1',3',5'-trien-3'-yloxy)-21-hydroxypregn-5-en-20-one hemisuccinate | Example 110. |
| 119 | 3β-(9'α-fluoro-11'β,17'α,21'-trihydroxy-20'-oxo-16'-methylenepregna-1',3',5'-trien-3'-yloxy)-androst-5-en-17-one 21'-hemiphthalate | Example 107. |
| 120 | 3α-(6'α,9'α-difluoro-11',20'-dioxo-17'α,21'-dihydroxypregna-1',3',5'-trien-3'-yloxy)-5β-androstan-17-one 21'-hemiphthalate | Example 109. |
| 121 | 3-(11',20°-dioxo-17'α,21'-dihydroxypregna-3',5'-dien-3'-yloxy)-estra 1,3,5(10)-trien-17α-ol 17-acetate, 21'-hemiphthalate | Example 111. |

EXAMPLE 122

3β-(17'-acetoxy-19'-nor-17'α-pregna13',5'-dien-20'-yn-3'-yloxy)-pregn-5-en-20β-ol hemisuccinate A mixture of 2.5 g. 3β-(17'β-acetoxy - 19'-nor-17'α-pregna-3',5'-dien-20'-yn-3'-yloxy)-pregn-5-en-20β-ol (Ex. 79) and 7.5 g. succinic anhydride in 50 ml. pyridine was kept at 60° C. for 60 hours under nitrogen. The solution was then poured into ice and water, cautiously acidified with diluted hydrochloric acid and the precipitate filtered under vacuum and throroughly washed with water. A crystallization from methylene chloride-methanol gives 1.5 g. 3β-(17'β-acetoxy-19'-nor-17'α-pregna-3',5'-dien-20'-yn-3'-yloxy)-pregn-5-en-20β-ol hemisuccinate melting at 146–149° C. A further crystallization gives the analytical sample melting at 148–151° C., $[\alpha]^D_{25} = -102.6°$ (c.=1, dioxane).

In accordance with the above procedure using instead of succinic anhydride, the anhydride of the acetic, propionic, butirric, valeric, enanthic, caproic, benzoic, malonic, phthalic and glutaric acid and instead of 3β-(17'β - acetoxy-19'-nor-17'α-pregna-3',5'-dien-20'-yn-3'-yloxy)-pregn-5-en-20β-ol any 17- or 20-hydroxy free disteroidyl ether obtained by any example of the disclosure, the corresponding 17-or 20-esters may be prepared. In particular the following disteroidyl ethers are obtained.

| Ex. | Name | Preparation from end-product— |
|---|---|---|
| 123 | 3β-(17'β-enanthoxy-19'-nor-17'α-pregna-3',5'-dien-20'-yn-3'-yloxy)-pregn-5-en-20β-ol hemisuccinate | Example 82. |
| 124 | 3β-(17'β-benzoyloxy-19'-nor-17'α-pregna-3',5'-dien-20'-yn-3'-yloxy)-pregn-5-en-20β-ol hemisuccinate | Example 83. |
| 125 | 3β-(17'β-hydroxy-21'-methylene-19'-nor-17'α-pregna-3',5'-dien-20'-yloxy)-pregn-5-en-20β-ol 20-hemisuccinate | Example 85. |
| 126 | 3β-(17'-oxoestra-3',5'-dien-3'-yloxy)-pregn-5-en-20β-ol hemisuccinate | Example 95. |
| 127 | 3β-(17'β-hydroxy-21'-methylene-19'-nor-17'α-pregna-3',5'-dien-3'-yloxy)-pregn-5-en-20α-ol hemisuccinate | Example 98. |
| 128 | 3β-(17'β-hydroxy-19'-nor-17'α-pregna-3',5'-dien-20'-yn-3-yloxy)-pregn-5-en-20β-ol 20-hemisuccinate | Example 84. |
| 129 | 3α-(17'β-acetoxy-6'α,21'-dimethyl-17'α-pregna-3',5'-dien-20'-yn-3'-yloxy)-5β-pregnan-20-ol hemisuccinate | Example 87. |
| 130 | 3β-(17'α-acetoxy-20'-oxo-6'-methylpregna-3',5'-dien-3'-yloxy)-pregn-5-en-20β-ol hemisuccinate | Example 88. |

3β-(17'β-acetoxy-19'-nor-17'α-pregna-3',5'-dien-20'-yn-3'-yloxy)-pregn-5-en-20β-ol hemisuccinate (Ex. 122), 3β - (17'β - enanthoxy-19'-nor-17'α-pregna-3',5'-dien-20'-yn-3'-yloxy)-pregn-5-en-20β-ol hemisuccinate (Ex. 123) and 3β(17'β-hydroxy-21'-methylene-19'-nor-17'α-pregna-3',5'-dien-3'-yloxy)-pregn-5-en-20β-ol 20 - hemisuccinate (Ex. 125) display a very high endometrial activity after subcutaneous or intravenous treatment and a very-high progestinic activity in rabbits. They also show a remarkable hypnotic effect in rats by intravenous administration.

3β - (17'β-enanthoxy-19'-nor-17'α-pregna-3',5'-dien-20'-yn-3'-yloxy)-pregn-5-en-20β-ol hemisuccinate (Ex. 123) is an interesting progestinic agent.

3β - (17'β-hydroxy-21'-methylene-19'-nor-17'α-pregna-3',5'-dien-3'-yloxy)-pregn-5-en-20α-ol hemisuccinate (Ex. 127) shows a high progestinic activity in Clauberg test after intravenous treatment. It gives also a significant pregnancy protection in rats after oral treatment.

EXAMPLE 131

3β-(17'α-acetoxy-20'-oxo-6'-methylenepregna-3',5'-dien-3'-yloxy)-pregn-5-en-20-ol sulphate sodium salt In a flask provided with a stopper, 9.4 ml. anhydroxy pyridine and 0.42 ml. acetic anhydride were added to 0.721 g. anhydrous sulphate pyridine and the mixture was stirred for 30 minutes. A solution of 1 g. of 3β-(17'α-acetoxy-20'-oxo-16'-methylenepregna-3',5'-dien-3-yloxy)-pregn-5-en-20'β-ol (Ex. 86) in 10 ml. pyridine was added and the mixture kept under stirring overnight at room temperature. The contents of the flask were evaporated under reduced pressure at 40° C. and the residue was taken up with water, adjusted to a pH 11–12 with a 5% aqueous solution of sodium hydrate and extracted with successive portions of n-butanol. Then butanol was removed by a short heating and the residue, taken up with ether, gives 1 g. 3β-(17'α-acetoxy-20'-oxo-16'-methylenepregna-3',5'-dien-3'-yloxy)-pregn-5-en-20-ol sulphate, sodium salt.

In accordance with the above procedure the following disteroidyl ether is obtained.

| Ex. | Name | Preparation from end-product— |
|---|---|---|
| 132 | 3β-[16'α,17'α-(1''-methyl-benzylidenedioxy)-20'-oxopregna-3',5'-dien-3'-yloxy]-pregn-5-en-20α-ol sulphate sodium salt | Example 99. |

EXAMPLE 133

3β-(9'α,11'β-dichloro-17'α,21'-dihydroxy-20' - oxopregna-1',3',5'-trien-3'-yloxy)-androst-5-en-17-one 21'-disodium phosphate To a solution of 0.1 ml. of redistilled phosphorus oxychloride in 5 ml. of pyridine is added at —25° C. with stirring a solution of 400 mg. of 3β-(9'α,11'β-dichloro-17'α,21'-dihydroxy-20'-oxopregna-1',3',5'-trien-3'-yloxy)-androst-5-en-17-one (Ex. 105) in 5 ml. of anhydrous pyridine. To the dichloride thus formed 20 ml. of water is added at the rate that the reaction temperature does not exceed —10° C. The mixture is then allowed to remain at room temperature for 10 minutes and the pyridine is removed in vacuo without applying external heat. The resulting residue is taken up in water, then sodium bicarbonate solution is carefully added until the mixture reaches pH 7. After extraction with chloroform, the aqueous phase is concentrated under vacuum to dryness. The residue is dissolved in methanol and the 3β-(9'α,11'β-dichloro-17'α,21'-dihydroxy-20'-oxopregna-1',3',5' - trien-3' - yloxy)-androst-5-en-17-one 21'-disodium phosphate precipitated by addition of 1:1 mixture of anhydrous ether and absolute ethanol.

In accordance with the above procedure the following disteroidyl ether is obtained.

| Ex. | Name | Preparation from end-product— |
|---|---|---|
| 134 | 3-(9'α-fluoro-11',20'-dioxo-17'α,21'dihydroxy-16'-methylenepregna-1',3',5'-trien-3'-yloxy)-estra-1,3,5(10)-trien-17-one 21'-disodium phosphate. | Example 108 |

EXAMPLE 135

3β-(17'β-hydroxy-17'α-methylandrosta-3',5'-dien-3'-yloxy)-17α-methylandrost-5-en-17β-ol A solution of 5 g. 3β-(17'-oxoandrosta-3',5'-dien-3'-yloxy)-androst-5-en-17-one (Ex. 68) in 100 ml. anhydrous tetrahydrofuran was added to 200 ml. of tetrahydrofuran solution of methylmagnesium bromide prepared from 20 g. magnesium and 100 g. methylbromide. The mixture was refluxed for 6 hours and then decomposed with saturated ammonium chloride. Extraction with ether, followed by removal of the solvents under reduced pressure, and recrystallization of the residue from methylene chloride-acetone, afforded 3.4 g. of crystals of 3β-(17'β-hydroxy - 17'α - methylandrosta-3',5'-dien-3'-yloxy)-17α-methylandrost-5-en-17β-ol.

In accordance with the above procedure using a suitable alkylmagnesium halide, the following disteroidyl ethers are obtained.

What is claimed is:

1. A disteroidyl ether consisting of two steriod moieties $St$ and $St'$ joined together at the $C_3$ position by an oxygen atom, wherein the steroid moiety $St$ is selected from the group consisting of:

(1) an androstane, a 19-norandrostane and a 13-ethylgonane derivative of the 5α- and 5β-series, optionally containing a $\Delta^1, \Delta^4, \Delta^5$, or $\Delta^{5(10)}$ bond; having at the $C_6$-position a substituent selected from the group consisting of hydrogen, a methyl group, a halogen atom and a ketonic oxygen; and having at the $C_{17}$ position at least one substituent selected from the group consisting of a 17-keto group; a 17β-hydroxy group; a 17β-acyloxy group containing up to 8 carbon atoms; an ether of said 17β-hydroxy group with an aliphatic or cycloaliphatic radical containing up to 6 carbon atoms; a combination of a 17β-hydroxy group together with a 17α-lower alkyl, alkenyl or alkynyl group; a combination of an ester of said 17β-hydroxy group with a hydrocarbon carboxylic acid radical containing up to 8 carbon atoms together with a 17α-lower alkyl, alkenyl or alkynyl group; and a com-

| Ex. | Name | Preparation from— |
|---|---|---|
| 136 | 3β-(17'β-hydroxy-17'α-methylestra-3',5'-dien-3'-yloxy)-pregn-5-en-20α-ol | End-product Ex. 97 and CH₃ MgB |
| 137 | 3β-(17'β-hydroxy-21'-methylene-19'-nor-17'α-pregna-3',5'-dien-3'-yloxy)-pregn-5-en-20α-ol | End-product Ex. 97 and CH₂=CH—CH₂ MgB |

EXAMPLE 138

3β-[17'β-(1''-ethoxyethoxy)-19'-nor-17'α-pregna-3',5'-dien-20'-yn-3'-yloxy]-pregn-5-en-20-one A solution of 2 g. 3β-(17'β-hydroxy-19'-nor-17'α-pregna-3',5'-dien-20'-yn-3'-yloxy)-pregn-5-en-20-one (Ex. 89) in 10 ml. anhydrous tetrahydrofurane and 4 ml. ethylvinyl ether was treated with 10 mg. pyridine tosylate and kept under stirring for 24 hours at room temperature. After addition of some drops of pyridine, the solution was filtered through a thin layer of alumina and the solvent removed under vacuum. The residue taken up with methanol crystallized to give 2 g. 3β-[17'β-(1''-ethoxyethoxy)-19' - nor-17'α-pregna-3',5'-dien-20'-yn-3'-yloxy]-pregn-5-en-20-one melting at 140–142° C. A crystallization from methylene chloride-methanol gives the analytical sample melting at 144–148° C. $[\alpha]^D_{25°} = -136°$ (c.=1, dioxane).

In accordance with the above procedure the following disteroidyl ethers are obtained.

bination of an ether of said 17β-hydroxy group with an aliphatic or cycloaliphatic radical containing up to 6 carbon atoms together with a 17α-lower alkyl, alkenyl or alkynyl group;

(2) a cholestane derivative selected from the group consisting of cholest-5-ene, a lower alkyl ester of 12α-hydroxy-5β-cholanic acid, and a lower alkyl ester of 12α-acetoxy-5β-cholanic acid;

(3) an estra-1,3,5(10)-triene derivative having at the $C_{16}$-position a substituent selected from the group consisting of hydrogen, an α-hydroxy group, a β-hydroxy group, a lower acyl ester of said α- and β-hydroxy groups, and a halogen atom; and having at the $C_{17}$-position at least one substituent selected from the group consisting of a 17-keto group; a 17β-hydroxy group; a 17β-acyloxy group containing up to 8 carbon atoms; a combination of a 17α-ethynyl group together with a 17β-hydroxy group; and a combination of a 17α-ethynyl group together with a 17β-

| Ex. | Name | Preparation from— |
|---|---|---|
| 139 | 3β-[17'β-(1''-ethoxyethoxy)-13'β-ethyl-17'α-ethynylgona-3',5'-dien-3'-yloxy]-pregn-5-en-20-one | End-product 92 and CH₂=CH—OC₂H₅. |
| 140 | 3β-[17'β-[1''-(β-chloro-ethoxy)-ethoxy]-13'β-ethyl-17'α-ethynylgona-3',5'-dien-3'-yloxy]-pregn-5-en-20-one | End-product 92 and CH₂=CH—OC₂H₄Cl. |

In accordance with the procedure of Example 1 the following steroids are further obtained.

acyloxy group wherein the acyl group contains up to 8 carbon atoms; and

| Ex. | Name | Preparation from— |
|---|---|---|
| 141 | 3β-(17'β-propionoxyestra-3',5'-dien-3'-yloxy)-6α-fluoro-5α-androstan-17β-ol acetate | A₃₅ plus B₅. |
| 142 | 3β-(17'β-cyclopentanecarboxyloxy-19'-nor-17'α-pregna-3',5'-dien-20'-yn-3'-yloxy)-6α-chloro-5α-androstan-17β-ol acetate | A₃₆ plus B₆. |
| 143 | 3β-(6'-fluoro-17'β-acetoxy-19'-nor-17'α-pregna-3',5'-dien-20'-yn-3'-yloxy)-19-nor-17α-pregn-5-en-20-yn-17β-ol acetate | A₈ plus B₆₃. |

(4) a pregnane of the 5α- and 5β-series and the corresponding 19-nor and 18-homo derivatives thereof, optionally containing a Δ⁵ bond; having at the $C_6$-position a substituent selected from the group consisting of hydrogen, a methyl group, a halogen atom and a ketonic oxygen; having at the $C_{17α}$-position a substituent selected from the group consisting of a hydrogen atom, a hydroxy group, and an acyloxy group containing up to 8 carbon atoms; having at the $C_{20}$-position a substituent selected from the group consisting of a ketonic oxygen, an α-hydroxy group, a β-hydroxy group, an ester of said α- and β-hydroxy groups with a hydrocarbon mono-carboxylic acid radical containing up to 8 carbon atoms, an ester of said α- and β- hydroxy groups with a hydrocarbon di-carboxylic acid radical selected from the group consisting of a hemisuccinyl, hemimalonyl, hemiglutaryl, and a hemiphthalyl radical, and a sulfate or phosphate ester of said α- and β-hydroxy groups, and having at the $C_{21}$-position a substituent selected from the group consisting of hydrogen, a hydroxy group, an ester of said hydroxy group with a hydrocarbon mono-carboxylic acid radical containing up to 8 carbon atoms, an ester of said hydroxy group with a hydrocarbon di-carboxylic acid radical selected from the group consisting of a hemisuccinyl, hemimalonyl, hemiglutaryl and a hemiphthalyl radical; and a sulfate or phosphate ester of said 21-hydroxy group;

and wherein the steroid moiety $St'$ is selected from the group consisting of:

(1') an androstane, a 19-norandrostane and a 13-ethylgonane derivative of the 5α- and 5β-series, optionally substituted by a methyl group in the $C_1$-position, said androstane, 19-norandrostane and 13-ethyl gonane derivative having an unsaturated structure selected from the group consisting of $Δ^2$-ene, $Δ^3$-ene, $Δ^{1,3}$-diene, $Δ^{3,5}$-diene and $Δ^{1,3,5}$-triene; having at the $C_6$-position a substituent selected from the group consisting of hydrogen, a methyl group, a halogen atom and a ketonic oxygen; having at the $C_{9α}$-position a substituent selected from the group consisting of a hydrogen and a halogen atom; having at the $C_{11}$-position a substituent selected from the group consisting of hydrogen, a hydroxy group, a ketonic oxygen, and a chlorine atom; and having at the $C_{17}$-position at least one substituent selected from the group consisting of a 17-keto group, a 17β-hydroxy group, a 17β-acyloxy group containing up to 8 carbon atoms, an ether of said 17β-hydroxy group with an aliphatic or cycloaliphatic radical containing up to 6 carbon atoms, a combination of a 17β-hydroxy group together with a 17α-lower alkyl, alkenyl or alkynyl group; a combination of an ester of said 17β-hydroxy group with a hydrocarbon carboxylic acid radical containing up to 8 carbon atoms together with a 17α-lower alkyl, alkenyl or alkynyl group; a combination of an ether of said 17β-hydroxy group with an aliphatic or cycloaliphatic radical containing up to 6 carbon atoms, together with a 17α-lower alkyl, alkenyl or alkynyl group; and a 17-spirolactone group; and (2') a 20-ketopregnane of the 5α- and 5β-series, and the corresponding 19-nor and 18-homo derivatives thereof, having an unsaturated structure selected from the group consisting of $Δ^2$-ene, $Δ^3$-ene, $Δ^{1,3}$-diene, $Δ^{3,5}$-diene and $Δ^{1,3,5}$-triene; having at the $C_6$-position a substituent selected from the group consisting of hydrogen, a methyl group, a halogen atom and a ketonic oxygen; having at the $C_{9α}$-position a substituent selected from the group consisting of a hydrogen and a halogen atom; having at the $C_{11}$-position a substituent selected from the group consisting of hydrogen, a hydroxy group, a ketonic oxygen and a chlorine atom; having at the $C_{16}$-position a substituent selected from the group consisting of hydrogen, a halogen atom, an α-hydroxy group, an α-acyloxy group containing up to 4 carbon atoms, an α-methyl group, a β-methyl group and a methylene group; having at the $C_{17α}$-position a substituent selected from the group consisting of hydrogen; a hydroxy group and an acyloxy group containing up to 8 carbon atoms; and having at the $C_{21}$-position a substituent selected from the group consisting of hydrogen, a halogen atom, a hydroxy group, an ester of said hydroxy group with a hydrocarbon mono-carboxylic acid radical containing up to 8 carbon atoms, an ester of said hydroxy group with a hydrocarbon di-carboxylic acid radical selected from the group consisting of a hemisuccinyl, hemimalonyl, hemiglutaryl and a hemiphthalyl radical; and a sulfate or phosphate ester of said 21-hydroxy group; said 20-ketopregnane derivative being also optionally substituted at the $C_{16}$ $C_{17}$-positions or at the $C_{17}$, $C_{21}$-positions by a lower alkylidenedioxy group.

2. Disteroidyl ethers of formula:

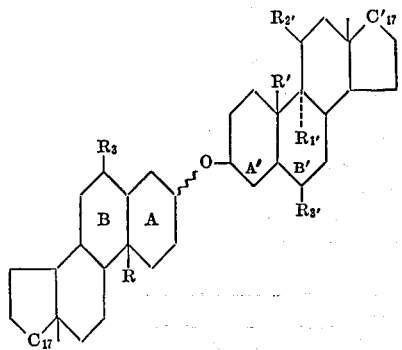

wherein the wavy line indicates that the oxygen atom linked in 3-position to the ring A may assume an α or β configuration;

R and R' each represent hydrogen or methyl;
$R_{1'}$ represents hydrogen or a halogen atom;
$R_{2'}$ represents hydrogen, a hydroxy or a ketonic oxygen; or a chlorine atom, where $R_{1'}$ is also a chlorine atom;
$R_3$ and $R_{3'}$ each represent hydrogen, a methyl group, a halogen atom or a ketonic oxygen;
$C_{17}$ and $C'_{17}$ each represent one of the following groups:

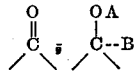

wherein A represents hydrogen, an aliphatic or cycloaliphatic radical containing up to 6 carbon atoms or an acyl radical containing up to 8 carbon atoms; B represents hydrogen or a saturated or unsaturated alkyl radical containing up to 4 carbon atoms; with the hydrogen atom in position 5, if present, having an α or β configuration; with the 13 and 13' positions optionally being substituted by an ethyl radical instead of by a methyl radical; the rings A and B optionally being saturated or optionally having an unsaturation between the carbon atoms in 1:2; 4:5; 5:6 or 5:10 positions; the rings A' and B' having one of the following structures:

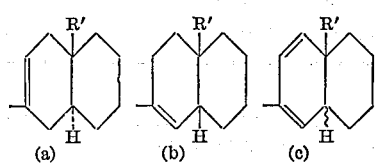

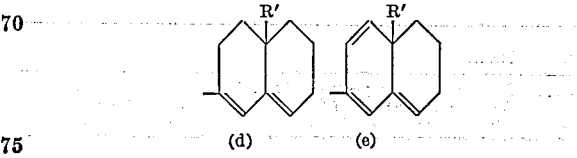

3. Disteroidyl ethers of formula:

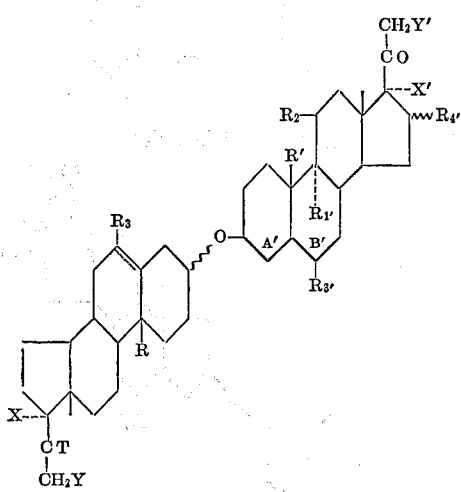

wherein the wavy line indicates that the oxygen atom linked in 3 position to the ring A may assume an α or β configuration; the broken lines indicate the optional presence of a double bond in the 5:6 position;

R and R' each represent hydrogen or methyl;
$R_{1'}$ represents hydrogen or a halogen atom;
$R_{2'}$ represents hydrogen, a hydroxy or a ketonic oxygen; or a chlorine atom, when $R_{1'}$ is also a chlorine atom;
$R_3$ and $R_{3'}$ each represent hydrogen, a methyl group, a halogen atom or a ketonic oxygen;
$R_{4'}$ represents hydrogen, a halogen atom, an α-hydroxy group free or esterified with an aliphatic acid containing up to 4 carbon atoms; or an α or β methyl radical;
T represents ketonic oxygen or a group

where $A^1$ is hydrogen or an acyl radical containing up to 8 carbon atoms;
X and X', Y and Y' each represent hydrogen, a hydroxy group or an acyloxy radical containing up to 8 carbon atoms, and Y' further represents a halogen atom; or
X' and Y' or X' and $R_{4'}$ may form together an acetal bond

wherein $R_{5'}$ represents an alkyl radical containing up to 6 carbon atoms or an aryl radical, and $R_{6'}$ represents an alkyl or alkyloxy radical containing up to 4 carbon atoms; or

may represent a cycloalkyl containing from 5 to 12 carbon atoms; with the hydrogen atom in 5 position, if present, having an α or β configuration; with the 13 and 13' positions optionally being substituted by an ethyl radical instead of by a methyl radical; the rings A' and B' having one of the following structures:

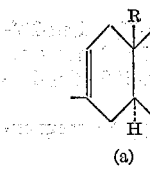 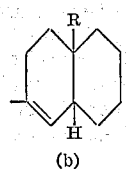 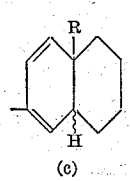
(a) (b) (c)

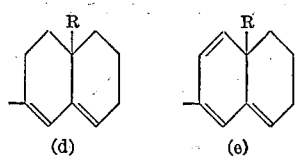
(d) (e)

4. Disteroidyl ethers of formula:

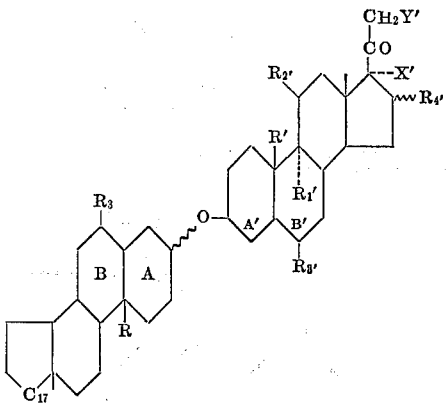

wherein the wavy line indicates that the oxygen atom linked in 3 position to the ring A may assume an α or β configuration; $C_{17}$ represents one of the following groups:

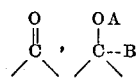

wherein A represents hydrogen, an aliphatic or cycloaliphatic radical containing up to 6 carbon atoms or an acyl radical containing up to 8 carbon atoms; and B represents hydrogen or a saturated or unsaturated alkyl radical containing up to 4 carbon atoms;

R and R' each represent hydrogen or methyl;
$R_{1'}$ represents hydrogen or a halogen atom;
$R_{2'}$ represents hydrogen, a hydroxy or a ketonic oxygen; or a chlorine atom, when $R_{1'}$ is also a chlorine atom;
$R_3$ and $R_{3'}$ each represent hydrogen, a methyl group, a halogen atom or a ketonic oxygen;
$R_{4'}$ represents hydrogen, a halogen atom, an α-hydroxy group free or esterified with an aliphatic acid containing up to 4 carbon atoms; or an α or β-methyl radical;
X' and Y' each represent hydrogen, a hydroxy group or an acyloxy radical containing up to 8 carbon atoms; and Y' further represents a halogen atom; or
X' and Y' or X' and $R_{4'}$ may form together an acetal bond

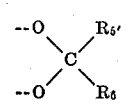

wherein $R_{5'}$ represents an alkyl radical containing up to 6 carbon atoms or an aryl radical, and $R_{6'}$ represents an alkyl or alkyloxy radical containing up to 4 carbon atoms; or

may represent a cycloalkyl containing from 5 to 12 carbon atoms; with the hydrogen atom in position 5, if present, having an α or β configuration; with the 13 and 13' positions optionally being substituted by an ethyl radical instead of by a methyl radical; the rings A and B optionally being saturated or optionally having an unsaturation between the carbon atoms in 1:2; 4:5; 5:6 or 5:10 positions; the rings A' and B' having one of the following structures:

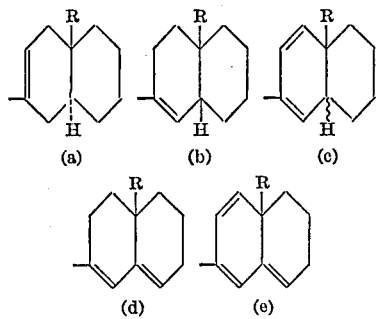

5. Disteroidyl ethers of formula:

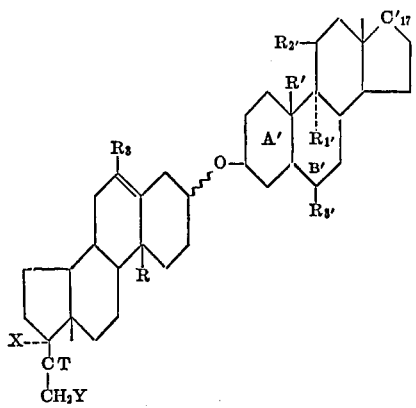

wherein the wavy line indicates that the oxygen atom linked in 3 position to the ring A may assume an α or β configuration; the broken line indicates the optional presence of a double bond in the 5:6 position;

R and R' each represent hydrogen or methyl;
$R_{1'}$ represents hydrogen or a halogen atom;
$R_{2'}$ represents hydrogen, a hydroxy or a ketonic oxygen; or a chlorine atom, when $R_{1'}$ is also a chlorine atom;
$R_3$ and $R_{3'}$ each represent hydrogen, a methyl group, a halogen atom or a ketonic oxygen;
$C'_{17}$ represents one of the following groups:

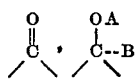

wherein A represents hydrogen, an aliphatic or cyclo-aliphatic radical containing up to 6 carbon atoms or an acyl radical containing up to 8 carbon atoms, and B represents hydrogen or a saturated or unsaturated alkyl radical containing up to 4 carbon atoms;

T represents ketonic oxygen or a group

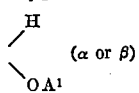

where $A^1$ is hydrogen or an acyl radical containing up to 8 carbon atoms;

X and Y each represent hydrogen, a hydroxy group or an acyloxy radical containing up to 8 carbon atoms;
with the hydrogen atom in position 5, if present, having an α or β configuration; with the 13 and 13' positions optionally being substituted by an ethyl radical instead of by a methyl radical; the rings A' and B' having one of the following structures:

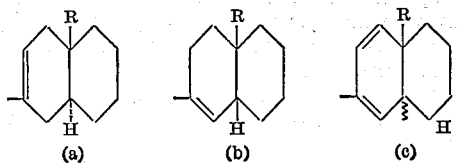

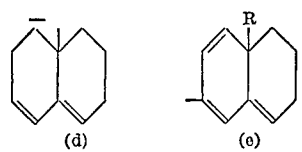

6. Disteroidyl derivatives of formula:

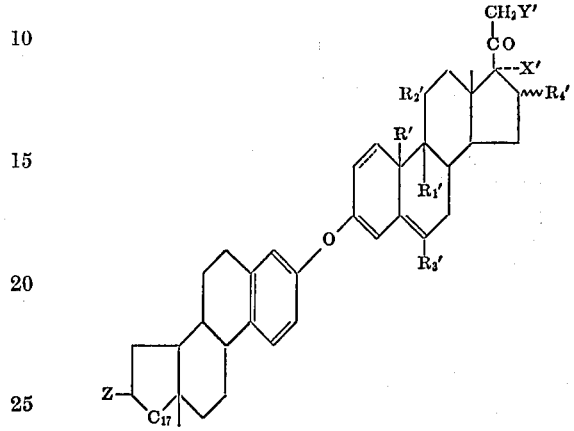

wherein the broken line in 1':2' position indicates the optional presence of a double bond;

R' presents hydrogen or methyl;
$R_{1'}$ represents hydrogen or a halogen atom;
$R_{2'}$ represents hydrogen, a hydroxy group or a ketonic oxygen; or a chlorine atom when $R_1$ is also a chlorine atom;
$R_{3'}$ represents hydrogen, a methyl radical or a halogen atom;
$R_{4'}$ represents hydrogen, a halogen atom, an α-hydroxy group, free or esterified with an aliphatic acid containing up to 4 carbon atoms, or an α- or β-methyl radical;
X' and Y' each represents hydrogen, a hydroxy group or an acyloxy radical containing up to 8 carbon atoms, and
Y' further represents a halogen atom;
$C_{17}$ represents

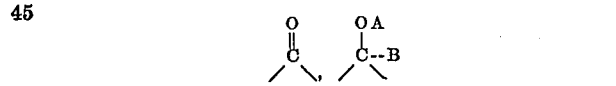

wherein A represents hydrogen or an acyl radical containing up to 8 carbon atoms; B represents hydrogen or an ethinyl group; Z is hydrogen, a free or esterified α- or β-hydroxy group or a halogen atom.

7. 3-(17'β-hydroxy- or lower acyloxy-19'-nor-17'α-pregna - 3',5' - dien - 20' - yn - 3' - yloxy) - estra - 1,3,5(10)-trien-17β-ol and the corresponding 17-lower alkanoate.

8. 3 - (17'β - hydroxy- or lower acyloxy - 19'-nor-17'α-pregna - 3',5' -dien - 20' - yn - 3' - yloxy) - 17α - ethynyl-estra-1,3,5(10)-trien-17β-ol the corresponding 17-lower alkanoate.

9. 3β-(17'α-acetoxy-20'-oxopregna-3',5'-dien-3'-yloxy)-17α-hydroxypregn-5-en-20-one acetate.

10. 3β-(17'β-acetoxy-19'-nor-17'α-pregna-3',5'-dien-20'-yn-3'-yloxy)-17α-hydroxypregn-5-en-20-one acetate.

11. 3β - (17'β - propionoxyestra - 3',5' - dien - 3'-yloxy)-5α-androstan-17-one.

12. 3β - (17'β - acetoxy - 19' - nor - 17'α - pregna - 3',5'-dien-20'-yl-3'-yloxy)-androst-5-en-17-one.

13. 3β - (17'β - acetoxy - 19'-nor-17'α-pregna-3',5'-dien-20'-yn-3'-yloxy)-pregn-5-en-20-one.

14. 3β-(17'β-acetoxy-19'-nor-17'α-pregna-3',5'-dien-20'-yn-3'-yloxy)-19-nor-17α-pregn-5-en-20-yn-17β-ol acetate.

15. 3β-(17'β-acetoxy-19'-nor-17'α-pregna-3',5'-dien-20'-yn-3'-yloxy)-androst-5-en-17β-ol.

16. 3α - (20'-oxo-5β-pregn-3'-en-3'-yloxy)-5β-pregnan-20-one.

17. 3α - (17'β - acetoxy-19'-nor-17'α-pregna-3',5'-dien-20'-yn-3'-yloxy)-5α-androstan-17-one.

18. 3α-(17'β-acetoxy-19'-nor-17'α-pregna-3',5'-dien-20'-yn-3'-yloxy)-5β-androstan-17-one.

19. 3β - (17'β - hydroxy - 19 - nor - 17'α - pregna-3',5-dien-20'-yn-3'-yloxy)-androst-5-en-17β-ol.

20. 3β-(17'β-acetoxy-19'-nor-17'α-pregna-3',5'-dien-20'-yn-3'-yloxy)-pregn-5-en-20β-ol hemisuccinate.

21. 3β - (17'β - enanthoxy - 19' - nor - 17'α - pregna-3',5'- -dien - 20' - yn - 3' - yloxy) - pregn - 5 - en - 20β-ol hemisuccinate.

22. 3β - (17'β - hydroxy - 19' - nor - 17'α - pregna-3',5-dien-20'-yn-3'-yloxy)-pregn-5-en-20-one.

23. 3β-[17'β-(1''-ethoxyethoxy)-19'-nor-17'α-pregna-3',5'-dien-20'-yn-3'-yloxy]-pregn-5-en-20-one.

24. 3β-(17'β-hydroxy-13'β-ethyl-17'α-ethinylgona-3',5'-dien-3'-yloxy)-pregna-5-en-20-one.

25. 3β - (17'β - hydroxy - 21' - methylene - 19' - nor-17'α-pregna-3',5'-dien-3'-yloxy)-pregna-5-en-20β-ol.

26. 3β - (17'α - acetoxy-20'-oxo-6'-methylpregna-3',5'-dien-3'-yloxy)-pregn-5-en-20-one.

27. 3β - (17'β - hydroxy - 21' - methylene - 19'-nor-17'α - pregna - 3',5' - dien - 3' - yloxy) - 5 - en - 20β - ol hemisuccinate.

28. 3β - (9α - fluoro - 11',20' - dioxo - 17'α - hydroxy-hemisuccinoxy - 16'β - methylpregna - 1',3',5' - trien - 3'-yloxy)-androst-5-en-17-one.

29. 3β - (17'β - hydroxy-19'-nor-17'α-pregna-3',5'-dien-20'-yn-3'-yloxy)-19-nor-17α-pregn-5-en-20-yn-17β-ol.

30. 3β-(17'β-hydroxy-21'-methylene-19'-nor-17'α-pregna-3',5'-dien-3'-yloxy)-pregn-5-en-20α-ol hemisuccinate.

31. 3 - (17'β-hydroxy-11'β-methyl-19'-nor-17'α-pregna-3',5'-dien-20'-yn-3'-yloxy)-estra-1,3,5(10)-trien - 17α - ol 17-acetate.

32. 3α - (17'β - hydroxy - 19' - nor - 17'α - pregna - 3',5-dien - 20' - yn - 3' - yloxy) - 12α - hydroxy - 5β - cholan-24-oic, and its potassium salt.

References Cited
UNITED STATES PATENTS

| | | | |
|---|---|---|---|
| 3,267,120 | 8/1966 | Wendt et al. | 260—397.5 X |
| 3,347,878 | 10/1967 | Boswell | 260—397.3 X |
| 3,501,507 | 3/1970 | Debono | 260—397.4 X |

HENRY A. FRENCH, Primary Examiner

U.S. Cl. X.R.

260—239.55 D, 397.2, 397.4, 397.45, 397.47, 397.5, 999